US012206635B2

(12) United States Patent
Baldwin et al.

(10) Patent No.: US 12,206,635 B2
(45) Date of Patent: *Jan. 21, 2025

(54) GENERATING AND DISPLAYING CUSTOMIZED AVATARS IN ELECTRONIC MESSAGES

(71) Applicant: Snap Inc., Santa Monica, CA (US)

(72) Inventors: Dorian Franklin Baldwin, Toronto (CA); Jacob Edward Blackstock, Toronto (CA); David James Kennedy, Toronto (CA); Shahan Panth, Toronto (CA)

(73) Assignee: SNAP INC., Santa Monica, CA (US)

( * ) Notice: Subject to any disclaimer, the term of this patent is extended or adjusted under 35 U.S.C. 154(b) by 595 days.

This patent is subject to a terminal disclaimer.

(21) Appl. No.: 17/451,285

(22) Filed: Oct. 18, 2021

(65) Prior Publication Data
US 2022/0109648 A1 Apr. 7, 2022

Related U.S. Application Data

(63) Continuation of application No. 17/247,169, filed on Dec. 2, 2020, now Pat. No. 11,218,433, which is a
(Continued)

(51) Int. Cl.
*H04L 67/52* (2022.01)
*G06F 3/0484* (2022.01)
(Continued)

(52) U.S. Cl.
CPC ............ *H04L 51/08* (2013.01); *G06F 3/0484* (2013.01); *G06T 13/80* (2013.01); *G06V 20/47* (2022.01);
(Continued)

(58) Field of Classification Search
CPC ... G07F 17/3239; G06F 21/316; H04L 67/22; H04L 51/32; H04L 67/306; H04L 51/04;
(Continued)

(56) References Cited

U.S. PATENT DOCUMENTS 666,223 A 1/1901 Shedlock
4,581,634 A 4/1986 Williams
(Continued)

FOREIGN PATENT DOCUMENTS

AU 2009283063 2/2010
CA 2887596 A1 7/2015
(Continued)

OTHER PUBLICATIONS

"A Guide to Advertising On Campus With Snapchat Geofilters", College Marketing Group, [Online] Retrieved from the Internet : <URL: https://collegemarketinggroup.com/blog/a-guide-toadvertising-on-campus-with-snapchat-geofilters/>, (Jul. 25, 2016), 5 pgs.
(Continued)

*Primary Examiner* — Hitesh Patel
(74) *Attorney, Agent, or Firm* — SCHWEGMAN LUNDBERG & WOESSNER, P.A.

(57) ABSTRACT

Among other things, embodiments of the present disclosure improve the functionality of electronic messaging software and systems by generating customized images with avatars of different users within electronic messages. For example, users of different mobile computing devices can exchange electronic communications with images generated to include avatars representing themselves as well as their friends, colleagues, and other acquaintances.

20 Claims, 9 Drawing Sheets

Related U.S. Application Data continuation of application No. 16/552,003, filed on Aug. 27, 2019, now Pat. No. 10,880,246, which is a continuation of application No. 15/365,046, filed on Nov. 30, 2016, now Pat. No. 10,432,559.

(60) Provisional application No. 62/412,115, filed on Oct. 24, 2016.

(51) Int. Cl.

| | | |
|---|---|---|
| *G06T 13/80* | (2011.01) | |
| *G06V 20/40* | (2022.01) | |
| *H04L 51/04* | (2022.01) | |
| *H04L 51/063* | (2022.01) | |
| *H04L 51/08* | (2022.01) | |
| *H04L 51/10* | (2022.01) | |
| *H04W 4/80* | (2018.01) | |

(52) U.S. Cl.
CPC ............ *H04L 51/04* (2013.01); *H04L 51/063* (2013.01); *H04L 51/10* (2013.01); *H04L 67/52* (2022.05); *H04W 4/80* (2018.02)

(58) Field of Classification Search
CPC .......... H04L 51/16; H04L 51/20; G06Q 50/01; G06Q 30/0255
See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,826,269 | A | 10/1998 | Hussey |
| 5,855,008 | A | 12/1998 | Goldhaber et al. |
| 5,880,731 | A | 3/1999 | Liles et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,023,270 | A | 2/2000 | Brush, II et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,158,044 | A | 12/2000 | Tibbetts |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,223,165 | B1 | 4/2001 | Lauffer |
| 6,233,318 | B1 | 5/2001 | Picard et al. |
| 6,283,858 | B1 | 9/2001 | Hayes, Jr. et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,374,292 | B1 | 4/2002 | Srivastava et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,473,794 | B1 | 10/2002 | Guheen et al. |
| 6,484,196 | B1 | 11/2002 | Maurille |
| 6,487,586 | B2 | 11/2002 | Ogilvie et al. |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,701,347 | B1 | 3/2004 | Ogilvie |
| 6,711,608 | B1 | 3/2004 | Ogilvie |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,772,195 | B1 | 8/2004 | Hatlelid et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,839,411 | B1 | 1/2005 | Saltanov et al. |
| 6,842,779 | B1 | 1/2005 | Nishizawa |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,073,129 | B1 | 7/2006 | Robarts et al. |
| 7,079,158 | B2 | 7/2006 | Lambertsen |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,243,163 | B1 | 7/2007 | Friend et al. |
| 7,269,426 | B2 | 9/2007 | Kokkonen et al. |
| 7,278,168 | B1 | 10/2007 | Chaudhury et al. |
| 7,280,123 | B2 | 10/2007 | Bentley et al. |
| 7,280,658 | B2 | 10/2007 | Amini et al. |
| 7,315,823 | B2 | 1/2008 | Brondrup |
| 7,342,587 | B2 | 3/2008 | Danzig et al. |
| 7,349,768 | B2 | 3/2008 | Bruce et al. |
| 7,356,564 | B2 | 4/2008 | Hartselle et al. |
| 7,376,715 | B2 | 5/2008 | Cunningham et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,468,729 | B1 | 12/2008 | Levinson |
| 7,478,402 | B2 | 1/2009 | Christensen et al. |
| 7,496,347 | B2 | 2/2009 | Puranik |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,469 | B2 | 5/2009 | Kim et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,627,828 | B1 | 12/2009 | Collison et al. |
| 7,636,755 | B2 | 12/2009 | Blattner et al. |
| 7,639,251 | B2 | 12/2009 | Gu et al. |
| 7,639,943 | B1 | 12/2009 | Kalajan |
| 7,650,231 | B2 | 1/2010 | Gadler |
| 7,668,537 | B2 | 2/2010 | DeVries |
| 7,689,649 | B2 | 3/2010 | Heikes et al. |
| 7,703,140 | B2 | 4/2010 | Nath et al. |
| 7,711,155 | B1 | 5/2010 | Sharma et al. |

(56) References Cited

U.S. PATENT DOCUMENTS

| | | |
|---|---|---|
| 7,770,137 B2 | 8/2010 | Forbes et al. |
| 7,775,885 B2 | 8/2010 | Van Luchene et al. |
| 7,778,973 B2 | 8/2010 | Choi |
| 7,779,444 B2 | 8/2010 | Glad |
| 7,787,886 B2 | 8/2010 | Markhovsky et al. |
| 7,792,789 B2 | 9/2010 | Prahlad et al. |
| 7,796,946 B2 | 9/2010 | Eisenbach |
| 7,801,954 B2 | 9/2010 | Cadiz et al. |
| 7,818,336 B1 | 10/2010 | Amidon et al. |
| 7,856,360 B2 | 12/2010 | Kramer et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,001,204 B2 | 8/2011 | Burtner et al. |
| 8,032,586 B2 | 10/2011 | Challenger et al. |
| 8,077,931 B1 | 12/2011 | Chatman et al. |
| 8,082,255 B1 | 12/2011 | Carlson, Jr. et al. |
| 8,088,044 B2 | 1/2012 | Tchao et al. |
| 8,090,351 B2 | 1/2012 | Klein |
| 8,095,878 B2 | 1/2012 | Bates et al. |
| 8,098,904 B2 | 1/2012 | Ioffe et al. |
| 8,099,109 B2 | 1/2012 | Altman et al. |
| 8,108,774 B2 | 1/2012 | Finn et al. |
| 8,112,716 B2 | 2/2012 | Kobayashi |
| 8,117,281 B2 | 2/2012 | Robinson et al. |
| 8,130,219 B2 | 3/2012 | Fleury et al. |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,146,005 B2 | 3/2012 | Jones et al. |
| 8,151,191 B2 | 4/2012 | Nicol |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,195,748 B2 | 6/2012 | Hallyn |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| 8,396,708 B2 | 3/2013 | Park et al. |
| 8,402,097 B2 | 3/2013 | Szeto |
| 8,405,773 B2 | 3/2013 | Hayashi et al. |
| 8,413,059 B2 | 4/2013 | Lee et al. |
| 8,418,067 B2 | 4/2013 | Cheng et al. |
| 8,423,409 B2 | 4/2013 | Rao |
| 8,425,322 B2 | 4/2013 | Gillo et al. |
| 8,457,367 B1 | 6/2013 | Sipe et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,570,326 B2 | 10/2013 | Gorev |
| 8,570,907 B2 | 10/2013 | Garcia, Jr. et al. |
| 8,581,911 B2 | 11/2013 | Becker et al. |
| 8,594,680 B2 | 11/2013 | Ledlie et al. |
| 8,597,121 B2 | 12/2013 | del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,648,865 B2 | 2/2014 | Dawson et al. |
| 8,655,389 B1 | 2/2014 | Jackson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,700,012 B2 | 4/2014 | Ferren et al. |
| 8,718,333 B2 | 5/2014 | Wolf et al. |
| 8,724,622 B2 | 5/2014 | Rojas |
| 8,730,231 B2 | 5/2014 | Snoddy et al. |
| 8,732,168 B2 | 5/2014 | Johnson |
| 8,738,719 B2 | 5/2014 | Lee et al. |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,887,035 B2 | 11/2014 | Mcdonald et al. |
| 8,890,926 B2 | 11/2014 | Tandon et al. |
| 8,892,999 B2 | 11/2014 | Nims et al. |
| 8,893,010 B1 | 11/2014 | Brin et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,935,656 B2 | 1/2015 | Dandia et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,002,643 B2 | 4/2015 | Xu |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,135,726 B2 | 9/2015 | Kafuku |

(56) References Cited

U.S. PATENT DOCUMENTS

| | | |
|---|---|---|
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,224,220 B2 | 12/2015 | Toyoda et al. |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,258,459 B2 | 2/2016 | Hartley |
| 9,264,463 B2 | 2/2016 | Rubinstein et al. |
| 9,276,886 B1 | 3/2016 | Samaranayake |
| 9,285,951 B2 | 3/2016 | Makofsky et al. |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,380,325 B1 | 6/2016 | Cormie et al. |
| 9,385,983 B1 | 7/2016 | Sehn |
| 9,392,308 B2 | 7/2016 | Ahmed et al. |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,460,541 B2 | 10/2016 | Li et al. |
| 9,480,924 B2 | 11/2016 | Haslam |
| 9,482,882 B1 | 11/2016 | Hanover et al. |
| 9,482,883 B1 | 11/2016 | Meisenholder |
| 9,485,747 B1 | 11/2016 | Rodoper et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,635,195 B1 | 4/2017 | Green et al. |
| 9,641,870 B1 | 5/2017 | Cormie et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,710,821 B2 | 7/2017 | Heath |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,773,284 B2 | 9/2017 | Huang et al. |
| 9,785,796 B1 | 10/2017 | Murphy et al. |
| 9,792,714 B2 | 10/2017 | Li et al. |
| 9,824,463 B2 | 11/2017 | Ingrassia et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,121,055 B1 | 11/2018 | Savvides et al. |
| 10,127,945 B2 | 11/2018 | Ho et al. |
| 10,146,748 B1 | 12/2018 | Barndollar et al. |
| 10,155,168 B2 | 12/2018 | Blackstock et al. |
| 10,158,589 B2 | 12/2018 | Collet et al. |
| 10,178,507 B1 | 1/2019 | Roberts |
| 10,194,270 B2 | 1/2019 | Yokoyama et al. |
| 10,212,541 B1 | 2/2019 | Brody et al. |
| 10,237,692 B2 | 3/2019 | Shan et al. |
| 10,242,477 B1 | 3/2019 | Charlton et al. |
| 10,242,503 B2 | 3/2019 | McPhee et al. |
| 10,251,128 B2 * | 4/2019 | Nguyen ............... H04L 51/18 |
| 10,262,250 B1 | 4/2019 | Spiegel et al. |
| 10,339,365 B2 | 7/2019 | Gusarov et al. |
| 10,360,708 B2 | 7/2019 | Bondich et al. |
| 10,362,219 B2 | 7/2019 | Wilson et al. |
| 10,375,519 B2 | 8/2019 | Pai et al. |
| 10,382,378 B2 | 8/2019 | Garcia et al. |
| 10,432,498 B1 | 10/2019 | Mcclendon |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,496,661 B2 | 12/2019 | Morgan et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,803,527 B1 | 10/2020 | Zankat et al. |
| 10,880,246 B2 | 12/2020 | Baldwin et al. |
| 10,938,758 B2 | 3/2021 | Allen et al. |
| 10,952,013 B1 | 3/2021 | Brody et al. |
| 10,963,529 B1 | 3/2021 | Amitay et al. |
| 10,984,569 B2 | 4/2021 | Bondich et al. |
| 11,048,916 B2 | 6/2021 | Gusarov et al. |
| 11,218,433 B2 | 1/2022 | Baldwin et al. |
| 11,229,849 B2 | 1/2022 | Blackstock et al. |
| 11,607,616 B2 | 3/2023 | Blackstock et al. |
| 11,843,456 B2 | 12/2023 | Allen et al. |
| 11,876,762 B1 | 1/2024 | Allen et al. |
| 11,925,869 B2 | 3/2024 | Blackstock et al. |
| 2002/0035607 A1 | 3/2002 | Checkoway et al. |
| 2002/0047868 A1 | 4/2002 | Miyazawa |
| 2002/0059193 A1 | 5/2002 | Decime et al. |
| 2002/0067362 A1 | 6/2002 | Agostino Nocera et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0169644 A1 | 11/2002 | Greene |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0206171 A1 | 11/2003 | Kim et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |

(56) References Cited

U.S. PATENT DOCUMENTS

| | | |
|---|---|---|
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0143136 A1 | 6/2005 | Lev et al. |
| 2005/0144241 A1 | 6/2005 | Stata et al. |
| 2005/0162419 A1 | 7/2005 | Kim et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2005/0280660 A1 | 12/2005 | Seo et al. |
| 2005/0288954 A1 | 12/2005 | McCarthy et al. |
| 2006/0026067 A1 | 2/2006 | Nicholas et al. |
| 2006/0031412 A1 | 2/2006 | Adams et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0145944 A1 | 7/2006 | Tarlton et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294465 A1 | 12/2006 | Ronen et al. |
| 2007/0004426 A1 | 1/2007 | Pfleging et al. |
| 2007/0011270 A1 | 1/2007 | Klein et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0113181 A1 | 5/2007 | Blattner et al. |
| 2007/0136228 A1 | 6/2007 | Petersen |
| 2007/0168863 A1 | 7/2007 | Blattner et al. |
| 2007/0174273 A1 | 7/2007 | Jones et al. |
| 2007/0176921 A1 | 8/2007 | Iwasaki et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0218987 A1 | 9/2007 | Luchene et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0258656 A1 | 11/2007 | Aarabi et al. |
| 2007/0260984 A1 | 11/2007 | Marks et al. |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0070593 A1 | 3/2008 | Altman et al. |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0097979 A1 | 4/2008 | Heidloff et al. |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158222 A1 | 7/2008 | Li et al. |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0201638 A1 | 8/2008 | Nair |
| 2008/0207176 A1 | 8/2008 | Brackbill et al. |
| 2008/0208692 A1 | 8/2008 | Garaventi et al. |
| 2008/0209329 A1 | 8/2008 | Defranco et al. |
| 2008/0214210 A1 | 9/2008 | Rasanen et al. |
| 2008/0216092 A1 | 9/2008 | Serlet |
| 2008/0222108 A1 | 9/2008 | Prahlad et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0309617 A1 | 12/2008 | Kong et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0013268 A1 | 1/2009 | Amit |
| 2009/0015703 A1 | 1/2009 | Kim et al. |
| 2009/0016617 A1 | 1/2009 | Bregman-amitai et al. |
| 2009/0024956 A1 | 1/2009 | Kobayashi |
| 2009/0030774 A1 | 1/2009 | Rothschild et al. |
| 2009/0030884 A1 | 1/2009 | Pulfer et al. |
| 2009/0030999 A1 | 1/2009 | Gatzke et al. |
| 2009/0036216 A1 | 2/2009 | Ratcliff |
| 2009/0040324 A1 | 2/2009 | Nonaka |
| 2009/0042588 A1 | 2/2009 | Lottin et al. |
| 2009/0044113 A1 | 2/2009 | Jones et al. |
| 2009/0047972 A1 | 2/2009 | Neeraj |
| 2009/0055484 A2 | 2/2009 | Vuong et al. |
| 2009/0058822 A1 | 3/2009 | Chaudhri |
| 2009/0070688 A1 | 3/2009 | Gyorfi et al. |
| 2009/0079743 A1 | 3/2009 | Pearson et al. |
| 2009/0079846 A1 | 3/2009 | Chou |
| 2009/0087035 A1 | 4/2009 | Wen et al. |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0099925 A1 | 4/2009 | Mehta et al. |
| 2009/0100367 A1 | 4/2009 | Dargahi et al. |
| 2009/0106672 A1 | 4/2009 | Burstrom |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0144639 A1 | 6/2009 | Nims et al. |
| 2009/0148045 A1 | 6/2009 | Lee et al. |
| 2009/0150778 A1 | 6/2009 | Nicol |
| 2009/0153492 A1 | 6/2009 | Popp |
| 2009/0153552 A1 | 6/2009 | Fidaleo et al. |
| 2009/0157450 A1 | 6/2009 | Athsani et al. |
| 2009/0157752 A1 | 6/2009 | Gonzalez |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0175521 A1 | 7/2009 | Shadan et al. |
| 2009/0177299 A1 | 7/2009 | Van De Sluis |

(56) References Cited

U.S. PATENT DOCUMENTS

| | | |
|---|---|---|
| 2009/0177976 A1 | 7/2009 | Bokor et al. |
| 2009/0192900 A1 | 7/2009 | Collision |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0228811 A1 | 9/2009 | Adams et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0254840 A1 | 10/2009 | Churchill et al. |
| 2009/0254859 A1 | 10/2009 | Arrasvuori et al. |
| 2009/0265604 A1 | 10/2009 | Howard et al. |
| 2009/0265647 A1 | 10/2009 | Martin et al. |
| 2009/0284551 A1 | 11/2009 | Stanton |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0300525 A1 | 12/2009 | Jolliff et al. |
| 2009/0303984 A1 | 12/2009 | Clark et al. |
| 2009/0319178 A1 | 12/2009 | Khosravy et al. |
| 2009/0319607 A1 | 12/2009 | Belz et al. |
| 2009/0327073 A1 | 12/2009 | Li |
| 2009/0328122 A1 | 12/2009 | Amento et al. |
| 2010/0009747 A1 | 1/2010 | Reville et al. |
| 2010/0011422 A1 | 1/2010 | Mason et al. |
| 2010/0023885 A1 | 1/2010 | Reville et al. |
| 2010/0045660 A1 | 2/2010 | Dettinger et al. |
| 2010/0045697 A1 | 2/2010 | Reville et al. |
| 2010/0058212 A1 | 3/2010 | Belitz et al. |
| 2010/0062794 A1 | 3/2010 | Han |
| 2010/0073458 A1 | 3/2010 | Pace |
| 2010/0082427 A1 | 4/2010 | Burgener et al. |
| 2010/0082693 A1 | 4/2010 | Hugg et al. |
| 2010/0083138 A1 | 4/2010 | Dawson et al. |
| 2010/0083140 A1 | 4/2010 | Dawson et al. |
| 2010/0083148 A1 | 4/2010 | Finn et al. |
| 2010/0100568 A1 | 4/2010 | Papin et al. |
| 2010/0100828 A1 | 4/2010 | Khandelwal et al. |
| 2010/0113065 A1 | 5/2010 | Narayan et al. |
| 2010/0115422 A1 | 5/2010 | Schroeter et al. |
| 2010/0115426 A1 | 5/2010 | Liu et al. |
| 2010/0121915 A1 | 5/2010 | Wang |
| 2010/0130233 A1 | 5/2010 | Parker |
| 2010/0131880 A1 | 5/2010 | Lee et al. |
| 2010/0131895 A1 | 5/2010 | Wohlert |
| 2010/0146407 A1 | 6/2010 | Bokor et al. |
| 2010/0153144 A1 | 6/2010 | Miller et al. |
| 2010/0153868 A1 | 6/2010 | Allen et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0179953 A1 | 7/2010 | Kan et al. |
| 2010/0179991 A1 | 7/2010 | Lorch et al. |
| 2010/0183280 A1 | 7/2010 | Beauregard et al. |
| 2010/0185552 A1 | 7/2010 | Deluca et al. |
| 2010/0185640 A1 | 7/2010 | Dettinger et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0197396 A1 | 8/2010 | Fujii et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0262915 A1 | 10/2010 | Bocking et al. |
| 2010/0273509 A1 | 10/2010 | Sweeney et al. |
| 2010/0274724 A1 | 10/2010 | Bible, Jr. et al. |
| 2010/0279713 A1 | 11/2010 | Dicke |
| 2010/0281045 A1 | 11/2010 | Dean |
| 2010/0281433 A1 | 11/2010 | Moody et al. |
| 2010/0290756 A1 | 11/2010 | Karaoguz et al. |
| 2010/0299060 A1 | 11/2010 | Snavely et al. |
| 2010/0306669 A1 | 12/2010 | Della Pasqua |
| 2010/0332980 A1 | 12/2010 | Sun et al. |
| 2011/0004071 A1 | 1/2011 | Faiola et al. |
| 2011/0010205 A1 | 1/2011 | Richards |
| 2011/0022965 A1 | 1/2011 | Lawrence et al. |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0047404 A1 | 2/2011 | Metzler et al. |
| 2011/0047505 A1 | 2/2011 | Fillion et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066664 A1 | 3/2011 | Goldman et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0099507 A1 | 4/2011 | Nesladek et al. |
| 2011/0102630 A1 | 5/2011 | Rukes |
| 2011/0113323 A1 | 5/2011 | Fillion et al. |
| 2011/0115798 A1 | 5/2011 | Nayar et al. |
| 2011/0119133 A1 | 5/2011 | Igelman et al. |
| 2011/0126096 A1 | 5/2011 | Ohashi et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0153759 A1 | 6/2011 | Rathod |
| 2011/0159890 A1 | 6/2011 | Fortescue et al. |
| 2011/0161076 A1 | 6/2011 | Davis et al. |
| 2011/0164163 A1 | 7/2011 | Bilbrey et al. |
| 2011/0167125 A1 | 7/2011 | Achlioptas |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0211764 A1 | 9/2011 | Krupka et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238762 A1 | 9/2011 | Soni et al. |
| 2011/0238763 A1 | 9/2011 | Shin et al. |
| 2011/0239136 A1 | 9/2011 | Goldman et al. |
| 2011/0239143 A1 | 9/2011 | Ye et al. |
| 2011/0246330 A1 | 10/2011 | Tikku et al. |
| 2011/0248992 A1 | 10/2011 | Van Os et al. |
| 2011/0249891 A1 | 10/2011 | Li |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0285703 A1 | 11/2011 | Jin |
| 2011/0286586 A1 | 11/2011 | Saylor et al. |
| 2011/0292051 A1 | 12/2011 | Nelson et al. |
| 2011/0300837 A1 | 12/2011 | Misiag |
| 2011/0314419 A1 | 12/2011 | Dunn et al. |
| 2011/0320373 A1 | 12/2011 | Lee et al. |
| 2012/0013770 A1 | 1/2012 | Stafford et al. |
| 2012/0015673 A1 | 1/2012 | Klassen et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |

(56) References Cited

U.S. PATENT DOCUMENTS

| | | |
|---|---|---|
| 2012/0069028 A1 | 3/2012 | Bouguerra |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113106 A1 | 5/2012 | Choi et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0130717 A1 | 5/2012 | Xu et al. |
| 2012/0131507 A1 | 5/2012 | Sparandara et al. |
| 2012/0131512 A1 | 5/2012 | Takeuchi et al. |
| 2012/0139830 A1 | 6/2012 | Hwang et al. |
| 2012/0141046 A1 | 6/2012 | Chen et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0215879 A1 | 8/2012 | Bozo |
| 2012/0220264 A1 | 8/2012 | Kawabata |
| 2012/0223940 A1 | 9/2012 | Dunstan et al. |
| 2012/0226748 A1 | 9/2012 | Bosworth et al. |
| 2012/0229506 A1 | 9/2012 | Nishikawa |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0271883 A1 | 10/2012 | Montoya et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0290977 A1 | 11/2012 | Devecka |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0309520 A1 | 12/2012 | Evertt et al. |
| 2012/0315987 A1 | 12/2012 | Walling |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0031180 A1 | 1/2013 | Abendroth et al. |
| 2013/0036165 A1 | 2/2013 | Tseng et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0073970 A1 | 3/2013 | Piantino et al. |
| 2013/0073984 A1 | 3/2013 | Lessin et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103760 A1 | 4/2013 | Golding et al. |
| 2013/0103766 A1 | 4/2013 | Gupta |
| 2013/0104053 A1 | 4/2013 | Thornton et al. |
| 2013/0110631 A1 | 5/2013 | Mitchell et al. |
| 2013/0110885 A1 | 5/2013 | Brundrett, III |
| 2013/0111354 A1 | 5/2013 | Marra et al. |
| 2013/0111514 A1 | 5/2013 | Slavin et al. |
| 2013/0124091 A1 | 5/2013 | Matas et al. |
| 2013/0128059 A1 | 5/2013 | Kristensson |
| 2013/0129084 A1 | 5/2013 | Appleton |
| 2013/0129252 A1 | 5/2013 | Lauper |
| 2013/0132477 A1 | 5/2013 | Bosworth et al. |
| 2013/0141463 A1 | 6/2013 | Barnett et al. |
| 2013/0145286 A1 | 6/2013 | Feng et al. |
| 2013/0151988 A1 | 6/2013 | Sorin et al. |
| 2013/0152000 A1* | 6/2013 | Liu ............... G06F 9/451 715/765 |
| 2013/0155169 A1 | 6/2013 | Hoover et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0174059 A1 | 7/2013 | Van Wie et al. |
| 2013/0179520 A1 | 7/2013 | Lee et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0198210 A1 | 8/2013 | Lee et al. |
| 2013/0201187 A1 | 8/2013 | Tong et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0249948 A1 | 9/2013 | Reitan |
| 2013/0257877 A1 | 10/2013 | Davis |
| 2013/0258040 A1 | 10/2013 | Kaytaz et al. |
| 2013/0260800 A1 | 10/2013 | Asakawa et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0311452 A1 | 11/2013 | Jacoby |
| 2013/0325964 A1 | 12/2013 | Berberat |
| 2013/0332068 A1 | 12/2013 | Kesar et al. |
| 2013/0339868 A1 | 12/2013 | Sharpe et al. |
| 2013/0344896 A1 | 12/2013 | Kirmse et al. |
| 2013/0344961 A1 | 12/2013 | Iannetta |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0011576 A1* | 1/2014 | Barbalet ............... A63F 13/71 463/31 |
| 2014/0019264 A1 | 1/2014 | Wachman et al. |
| 2014/0032682 A1 | 1/2014 | Prado et al. |
| 2014/0040066 A1 | 2/2014 | Fujioka |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055554 A1 | 2/2014 | Du et al. |

(56) References Cited

U.S. PATENT DOCUMENTS

| | | |
|---|---|---|
| 2014/0057660 A1 | 2/2014 | Wager |
| 2014/0082651 A1 | 3/2014 | Sharifi |
| 2014/0085293 A1 | 3/2014 | Konoplev et al. |
| 2014/0092130 A1 | 4/2014 | Anderson et al. |
| 2014/0095293 A1 | 4/2014 | Abhyanker |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0128166 A1 | 5/2014 | Tam et al. |
| 2014/0129343 A1 | 5/2014 | Finster et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0157139 A1 | 6/2014 | Coroy et al. |
| 2014/0160149 A1 | 6/2014 | Blackstock et al. |
| 2014/0173424 A1 | 6/2014 | Hogeg et al. |
| 2014/0173457 A1 | 6/2014 | Wang et al. |
| 2014/0176662 A1 | 6/2014 | Goodman |
| 2014/0189592 A1 | 7/2014 | Benchenaa et al. |
| 2014/0199970 A1 | 7/2014 | Klotz |
| 2014/0201527 A1 | 7/2014 | Krivorot |
| 2014/0207679 A1 | 7/2014 | Cho |
| 2014/0214471 A1 | 7/2014 | Schreiner, III |
| 2014/0218394 A1 | 8/2014 | Hochmuth et al. |
| 2014/0221089 A1 | 8/2014 | Fortkort |
| 2014/0222564 A1 | 8/2014 | Kranendonk et al. |
| 2014/0223372 A1 | 8/2014 | Dostie et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280058 A1 | 9/2014 | St. Clair |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289216 A1 | 9/2014 | Voellmer et al. |
| 2014/0289833 A1 | 9/2014 | Briceno |
| 2014/0306884 A1 | 10/2014 | Sano et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0347368 A1 | 11/2014 | Kishore et al. |
| 2014/0359024 A1 | 12/2014 | Spiegel |
| 2014/0359032 A1 | 12/2014 | Spiegel et al. |
| 2014/0362091 A1 | 12/2014 | Bouaziz et al. |
| 2014/0372420 A1 | 12/2014 | Slep |
| 2014/0380195 A1 | 12/2014 | Graham et al. |
| 2015/0005064 A1 | 1/2015 | Lee et al. |
| 2015/0020086 A1 | 1/2015 | Chen et al. |
| 2015/0038806 A1 | 2/2015 | Kaleal, III et al. |
| 2015/0042663 A1 | 2/2015 | Mandel et al. |
| 2015/0046278 A1 | 2/2015 | Pei et al. |
| 2015/0067880 A1 | 3/2015 | Ward et al. |
| 2015/0071619 A1 | 3/2015 | Brough |
| 2015/0081694 A1 | 3/2015 | Friedlander et al. |
| 2015/0084984 A1 | 3/2015 | Tomii et al. |
| 2015/0086087 A1 | 3/2015 | Ricanek, Jr. et al. |
| 2015/0087263 A1 | 3/2015 | Branscomb et al. |
| 2015/0088464 A1 | 3/2015 | Yuen et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0121251 A1 | 4/2015 | Kadirvel et al. |
| 2015/0123967 A1 | 5/2015 | Quinn et al. |
| 2015/0155007 A1 | 6/2015 | Barfield, Jr. et al. |
| 2015/0160832 A1 | 6/2015 | Walkin et al. |
| 2015/0169139 A1 | 6/2015 | Leva et al. |
| 2015/0169142 A1 | 6/2015 | Longo et al. |
| 2015/0169827 A1 | 6/2015 | Laborde |
| 2015/0169938 A1 | 6/2015 | Yao et al. |
| 2015/0172393 A1 | 6/2015 | Oplinger et al. |
| 2015/0172534 A1 | 6/2015 | Miyakawa et al. |
| 2015/0178260 A1 | 6/2015 | Brunson |
| 2015/0181380 A1 | 6/2015 | Altman et al. |
| 2015/0193522 A1 | 7/2015 | Choi et al. |
| 2015/0193585 A1 | 7/2015 | Sunna |
| 2015/0193819 A1 | 7/2015 | Chang |
| 2015/0195235 A1 | 7/2015 | Trussel et al. |
| 2015/0199082 A1 | 7/2015 | Scholler et al. |
| 2015/0201030 A1 | 7/2015 | Longo et al. |
| 2015/0206349 A1 | 7/2015 | Rosenthal et al. |
| 2015/0213604 A1 | 7/2015 | Li et al. |
| 2015/0220774 A1 | 8/2015 | Ebersman et al. |
| 2015/0222814 A1 | 8/2015 | Li et al. |
| 2015/0227602 A1 | 8/2015 | Ramu et al. |
| 2015/0232065 A1 | 8/2015 | Ricci et al. |
| 2015/0234942 A1 | 8/2015 | Harmon |
| 2015/0245168 A1 | 8/2015 | Martin |
| 2015/0261917 A1 | 9/2015 | Smith |
| 2015/0264432 A1 | 9/2015 | Cheng |
| 2015/0279098 A1 | 10/2015 | Kim et al. |
| 2015/0295866 A1 | 10/2015 | Collet et al. |
| 2015/0304806 A1 | 10/2015 | Vincent |
| 2015/0312184 A1 | 10/2015 | Langholz et al. |
| 2015/0324348 A1 | 11/2015 | Peterson et al. |
| 2015/0334077 A1 | 11/2015 | Feldman |
| 2015/0347519 A1 | 12/2015 | Hornkvist et al. |
| 2015/0350136 A1 | 12/2015 | Flynn, III et al. |
| 2015/0350262 A1 | 12/2015 | Rainisto et al. |
| 2015/0365795 A1 | 12/2015 | Allen et al. |
| 2015/0369623 A1 | 12/2015 | Blumenberg et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0021153 A1 | 1/2016 | Hull et al. |
| 2016/0045834 A1 | 2/2016 | Burns |
| 2016/0050169 A1 | 2/2016 | Ben et al. |
| 2016/0078095 A1 | 3/2016 | Man et al. |
| 2016/0085773 A1 | 3/2016 | Chang et al. |
| 2016/0085863 A1 | 3/2016 | Allen et al. |
| 2016/0086500 A1 | 3/2016 | Kaleal, III |
| 2016/0086670 A1 | 3/2016 | Gross et al. |
| 2016/0093078 A1 | 3/2016 | Davis et al. |
| 2016/0099901 A1 | 4/2016 | Allen et al. |
| 2016/0110922 A1 | 4/2016 | Haring |
| 2016/0134840 A1 | 5/2016 | Mcculloch |
| 2016/0158600 A1 | 6/2016 | Rolley |
| 2016/0163084 A1 | 6/2016 | Corazza et al. |
| 2016/0164823 A1 | 6/2016 | Nordstrom et al. |
| 2016/0179297 A1 | 6/2016 | Lundin et al. |
| 2016/0180391 A1 | 6/2016 | Zabaneh |
| 2016/0180447 A1 | 6/2016 | Kamalie et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0188997 A1 | 6/2016 | Desnoyer et al. |
| 2016/0189310 A1 | 6/2016 | O'kane |
| 2016/0210500 A1 | 7/2016 | Feng et al. |
| 2016/0217292 A1 | 7/2016 | Faaborg et al. |
| 2016/0217784 A1 | 7/2016 | Gelfenbeyn et al. |
| 2016/0234149 A1 | 8/2016 | Tsuda et al. |
| 2016/0239248 A1 | 8/2016 | Sehn |
| 2016/0241500 A1 | 8/2016 | Bostick et al. |
| 2016/0241504 A1 | 8/2016 | Raji et al. |
| 2016/0253807 A1 | 9/2016 | Jones et al. |
| 2016/0275721 A1 | 9/2016 | Park et al. |
| 2016/0277419 A1 | 9/2016 | Allen et al. |
| 2016/0286244 A1 | 9/2016 | Chang et al. |
| 2016/0292273 A1 | 10/2016 | Murphy et al. |
| 2016/0292905 A1 | 10/2016 | Nehmadi et al. |
| 2016/0294891 A1 | 10/2016 | Miller |
| 2016/0314759 A1 | 10/2016 | Shin et al. |
| 2016/0321708 A1 | 11/2016 | Sehn |
| 2016/0343160 A1 | 11/2016 | Blattner et al. |
| 2016/0350297 A1 | 12/2016 | Riza |
| 2016/0357578 A1 | 12/2016 | Kim et al. |

(56) References Cited

U.S. PATENT DOCUMENTS

| | | |
|---|---|---|
| 2016/0359957 A1 | 12/2016 | Laliberte |
| 2016/0359987 A1 | 12/2016 | Laliberte |
| 2016/0359993 A1 | 12/2016 | Hendrickson et al. |
| 2016/0378278 A1 | 12/2016 | Sirpal |
| 2016/0379415 A1 | 12/2016 | Espeset et al. |
| 2017/0006094 A1 | 1/2017 | Abou Mahmoud et al. |
| 2017/0006322 A1 | 1/2017 | Dury et al. |
| 2017/0027528 A1 | 2/2017 | Kaleal, III et al. |
| 2017/0034173 A1 | 2/2017 | Miller et al. |
| 2017/0039752 A1 | 2/2017 | Quinn et al. |
| 2017/0061308 A1 | 3/2017 | Chen et al. |
| 2017/0064240 A1 | 3/2017 | Mangat et al. |
| 2017/0069124 A1 | 3/2017 | Tong et al. |
| 2017/0076011 A1 | 3/2017 | Gannon |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0124116 A1 | 5/2017 | League |
| 2017/0126592 A1 | 5/2017 | El Ghoul |
| 2017/0132649 A1 | 5/2017 | Oliva et al. |
| 2017/0161382 A1 | 6/2017 | Ouimet et al. |
| 2017/0199855 A1 | 7/2017 | Fishbeck |
| 2017/0235848 A1 | 8/2017 | Van Deusen et al. |
| 2017/0256039 A1 | 9/2017 | Hsu et al. |
| 2017/0263029 A1 | 9/2017 | Yan et al. |
| 2017/0270970 A1 | 9/2017 | Ho et al. |
| 2017/0286752 A1 | 10/2017 | Gusarov et al. |
| 2017/0287006 A1 | 10/2017 | Azmoodeh et al. |
| 2017/0293673 A1 | 10/2017 | Purumala et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0324688 A1 | 11/2017 | Collet et al. |
| 2017/0336960 A1 | 11/2017 | Chaudhri et al. |
| 2017/0339006 A1 | 11/2017 | Austin et al. |
| 2017/0352179 A1 | 12/2017 | Hardee et al. |
| 2017/0353477 A1 | 12/2017 | Faigon et al. |
| 2017/0374003 A1 | 12/2017 | Allen et al. |
| 2017/0374508 A1 | 12/2017 | Davis et al. |
| 2018/0005420 A1 | 1/2018 | Bondich et al. |
| 2018/0024726 A1 | 1/2018 | Hviding |
| 2018/0025367 A1 | 1/2018 | Jain |
| 2018/0032212 A1 | 2/2018 | Choi et al. |
| 2018/0047200 A1 | 2/2018 | O'hara et al. |
| 2018/0060363 A1 | 3/2018 | Ko et al. |
| 2018/0068019 A1 | 3/2018 | Novikoff et al. |
| 2018/0088777 A1 | 3/2018 | Daze et al. |
| 2018/0091732 A1 | 3/2018 | Wilson et al. |
| 2018/0097762 A1 | 4/2018 | Garcia et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0374242 A1 | 12/2018 | Li et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0220932 A1 | 7/2019 | Amitay et al. |
| 2019/0266390 A1 | 8/2019 | Gusarov et al. |
| 2019/0287287 A1 | 9/2019 | Bondich et al. |
| 2019/0386941 A1 | 12/2019 | Baldwin et al. |
| 2020/0117339 A1 | 4/2020 | Amitay et al. |
| 2020/0117340 A1 | 4/2020 | Amitay et al. |
| 2020/0120097 A1 | 4/2020 | Amitay et al. |
| 2020/0120170 A1 | 4/2020 | Amitay et al. |
| 2021/0152505 A1 | 5/2021 | Baldwin et al. |
| 2021/0217217 A1 | 7/2021 | Bondich et al. |
| 2021/0266277 A1 | 8/2021 | Allen et al. |
| 2021/0295018 A1 | 9/2021 | Gusarov et al. |
| 2022/0134236 A1 | 5/2022 | Blackstock et al. |
| 2023/0269208 A1 | 8/2023 | Allen et al. |
| 2024/0195767 A1 | 6/2024 | Allen et al. |

FOREIGN PATENT DOCUMENTS

| | | |
|---|---|---|
| CN | 101720010 A | 6/2010 |
| CN | 101884036 | 11/2010 |
| CN | 102016887 | 4/2011 |
| CN | 103412885 | 11/2013 |
| CN | 103635892 | 3/2014 |
| CN | 104717366 | 6/2015 |
| CN | 105095272 A | 11/2015 |
| CN | 105630846 | 6/2016 |
| CN | 105765620 | 7/2016 |
| CN | 108885795 A | 11/2018 |
| CN | 109643370 A | 4/2019 |
| CN | 109863532 A | 6/2019 |
| CN | 110023985 A | 7/2019 |
| CN | 110168478 A | 8/2019 |
| CN | 110799937 A | 2/2020 |
| CN | 110800018 A | 2/2020 |
| CN | 110832538 A | 2/2020 |
| CN | 110945555 A | 3/2020 |
| CN | 111010882 A | 4/2020 |
| CN | 111343075 A | 6/2020 |
| CN | 111489264 A | 8/2020 |
| CN | 110023985 B | 7/2023 |
| CN | 116684370 A | 9/2023 |
| CN | 109863532 B | 2/2024 |
| CN | 117749754 A | 3/2024 |
| EP | 1736931 | 12/2006 |
| EP | 2051480 A1 | 4/2009 |
| EP | 2151797 A1 | 2/2010 |
| EP | 2184092 A2 | 5/2010 |
| EP | 3549089 B1 | 1/2024 |
| GB | 2399928 A | 9/2004 |
| JP | 2001230801 A | 8/2001 |
| JP | 2014006881 A | 1/2014 |
| JP | 5497931 B2 | 3/2014 |
| KR | 19990073076 A | 10/1999 |
| KR | 20000063919 A | 11/2000 |
| KR | 20010078417 A | 8/2001 |
| KR | 20040036436 A | 7/2004 |
| KR | 1020050036963 A | 4/2005 |
| KR | 20060124865 A | 12/2006 |
| KR | 20070008417 A | 1/2007 |
| KR | 20080011553 A | 2/2008 |
| KR | 20110012491 A | 2/2011 |
| KR | 20110014224 A | 2/2011 |
| KR | 20110054492 A | 5/2011 |
| KR | 1020120070898 A | 7/2012 |
| KR | 20130069730 A | 6/2013 |
| KR | 20140033088 A | 3/2014 |
| KR | 20140062706 | 5/2014 |
| KR | 20140103881 | 8/2014 |
| KR | 101445263 B1 | 9/2014 |
| KR | 20140107253 A | 9/2014 |
| KR | 20150081694 A | 7/2015 |
| KR | 101583181 | 1/2016 |
| KR | 20160016532 A | 2/2016 |
| KR | 20160025365 A | 3/2016 |
| KR | 20160028028 A | 3/2016 |
| KR | 20160051536 A | 5/2016 |
| KR | 20170091803 A | 8/2017 |
| KR | 102233700 B1 | 3/2021 |
| KR | 102253891 B1 | 5/2021 |
| KR | 102444789 | 9/2022 |
| KR | 102530504 | 5/2023 |
| KR | 102649278 B1 | 3/2024 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2003094072 A1 | 11/2003 |
| WO | 2004079530 | 9/2004 |
| WO | WO-2004095308 A1 | 11/2004 |
| WO | WO-2006107182 A1 | 10/2006 |
| WO | WO-2006118755 A2 | 11/2006 |
| WO | WO-2007092668 A2 | 8/2007 |
| WO | WO-2007134402 A1 | 11/2007 |
| WO | WO-2009043020 A2 | 4/2009 |

(56) References Cited

FOREIGN PATENT DOCUMENTS

| WO | WO-2011040821 A1 | 4/2011 |
|---|---|---|
| WO | WO-2011119407 A1 | 9/2011 |
| WO | WO-2012000107 A1 | 1/2012 |
| WO | WO-2012139276 A1 | 10/2012 |
| WO | WO-2012166072 A1 | 12/2012 |
| WO | WO-2013008238 A1 | 1/2013 |
| WO | WO-2013008251 A2 | 1/2013 |
| WO | WO-2013027893 A1 | 2/2013 |
| WO | WO-2013045753 A1 | 4/2013 |
| WO | WO-2013152454 A1 | 10/2013 |
| WO | WO-2013166588 A1 | 11/2013 |
| WO | WO-2014006129 A1 | 1/2014 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017173319 A1 | 10/2017 |
| WO | WO-2017176739 A1 | 10/2017 |
| WO | WO-2017176992 A1 | 10/2017 |
| WO | WO-2018005644 A1 | 1/2018 |
| WO | WO-2018006053 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2018200042 A1 | 11/2018 |
| WO | WO-2018200043 A1 | 11/2018 |
| WO | WO-2018201102 A1 | 11/2018 |
| WO | WO-2018201104 A1 | 11/2018 |
| WO | WO-2018201106 A1 | 11/2018 |
| WO | WO-2018201107 A1 | 11/2018 |
| WO | WO-2018201108 A1 | 11/2018 |
| WO | WO-2018201109 A1 | 11/2018 |
| WO | WO-2019089613 A1 | 5/2019 |

OTHER PUBLICATIONS

"U.S. Appl. No. 12/471,811, Advisory Action mailed Mar. 28, 2012", 6 pgs.
"U.S. Appl. No. 12/471,811, Examiner Interview Summary mailed Feb. 2, 2012", 3 pgs.
"U.S. Appl. No. 12/471,811, Examiner Interview Summary mailed Apr. 18, 2011", 3 pgs.
"U.S. Appl. No. 12/471,811, Examiner Interview Summary mailed May 27, 2014", 2 pgs.
"U.S. Appl. No. 12/471,811, Final Office Action mailed Dec. 23, 2011", 20 pgs.
"U.S. Appl. No. 12/471,811, Non Final Office Action mailed Jan. 13, 2011", 15 pgs.
"U.S. Appl. No. 12/471,811, Non Final Office Action mailed Jun. 28, 2011", 26 pgs.
"U.S. Appl. No. 12/471,811, Non Final Office Action mailed Oct. 24, 2014", 21 pgs.
"U.S. Appl. No. 12/471,811, Notice of Allowance mailed Apr. 1, 2015", 6 pgs.
"U.S. Appl. No. 12/471,811, Response filed Jan. 26, 2015 to Non Final Office Action mailed Oct. 24, 2014", 18 pgs.
"U.S. Appl. No. 12/471,811, Response filed Feb. 23, 2012 to Final Office Action mailed Dec. 23, 2011", 12 pgs.
"U.S. Appl. No. 12/471,811, Response filed Mar. 28, 2012 to Advisory Action mailed Mar. 28, 2012", 14 pgs.
"U.S. Appl. No. 12/471,811, Response filed Apr. 13, 2011 to Non Final Office Action mailed Jan. 13, 2011", 5 pgs.
"U.S. Appl. No. 12/471,811, Response filed Sep. 28, 2011 to Non Final Office Action mailed Jun. 28, 2011", 19 pgs.
"U.S. Appl. No. 13/979,974, Corrected Notice of Allowability mailed Nov. 19, 2018", 2 pgs.
"U.S. Appl. No. 13/979,974, Examiner Interview Summary mailed Jun. 29, 2017", 3 pgs.
"U.S. Appl. No. 13/979,974, Examiner Interview Summary mailed Sep. 15, 2017", 3 pgs.
"U.S. Appl. No. 13/979,974, Final Office Action mailed Apr. 25, 2018", 18 pgs.
"U.S. Appl. No. 13/979,974, Final Office Action mailed Jun. 9, 2017", 20 pgs.
"U.S. Appl. No. 13/979,974, Final Office Action mailed Oct. 12, 2016", 13 pgs.
"U.S. Appl. No. 13/979,974, Non Final Office Action mailed Feb. 22, 2017", 17 pgs.
"U.S. Appl. No. 13/979,974, Non Final Office Action mailed Apr. 27, 2016", 16 pgs.
"U.S. Appl. No. 13/979,974, Non Final Office Action mailed Oct. 3, 2017", 17 pgs.
"U.S. Appl. No. 13/979,974, Notice of Allowance mailed Aug. 10, 2018", 9 pgs.
"U.S. Appl. No. 13/979,974, Response filed Jan. 3, 2018 to Non Final Office Action mailed Oct. 3, 2017", 8 pgs.
"U.S. Appl. No. 13/979,974, Response filed May 22, 2017 to Non Final Office Action mailed Feb. 22, 2017", 10 pgs.
"U.S. Appl. No. 13/979,974, Response filed Jul. 25, 2018 to Final Office Action mailed Apr. 25, 2018", 10 pgs.
"U.S. Appl. No. 13/979,974, Response filed Jul. 26, 2016 to Non Final Office Action mailed Apr. 27, 2016", 8 pgs.
"U.S. Appl. No. 13/979,974, Response filed Sep. 11, 2017 to Final Office Action mailed Jun. 9, 2017", 8 pgs.
"U.S. Appl. No. 13/979,974, Response filed Jan. 12, 2017 to Non Final Office Action mailed Apr. 27, 2016", 8 pgs.
"U.S. Appl. No. 14/753,200, Non Final Office Action mailed Oct. 11, 2016", 6 pgs.
"U.S. Appl. No. 14/753,200, Notice of Allowance mailed Apr. 27, 2017", 7 pgs.
"U.S. Appl. No. 14/753,200, Response filed Feb. 13, 2017 to Non Final Office Action mailed Oct. 11, 2016", 9 pgs.
"U.S. Appl. No. 15/086,749, Final Office Action mailed Oct. 31, 2017", 15 pgs.
"U.S. Appl. No. 15/086,749, Final Office Action mailed Dec. 31, 2018", 14 pgs.
"U.S. Appl. No. 15/086,749, Non Final Office Action mailed Mar. 13, 2017", 12 pgs.
"U.S. Appl. No. 15/086,749, Non Final Office Action mailed Apr. 30, 2018", 14 pgs.
"U.S. Appl. No. 15/086,749, Notice of Allowance mailed Feb. 26, 2019", 7 pgs.
"U.S. Appl. No. 15/086,749, Response filed Feb. 11, 2019 to Final Office Action mailed Dec. 31, 2018", 10 pgs.
"U.S. Appl. No. 15/086,749, Response filed Apr. 2, 2018 to Final Office Action mailed Oct. 31, 2017", 14 pgs.
"U.S. Appl. No. 15/086,749, Response filed Aug. 29, 2018 to Non Final Office Action mailed Apr. 30, 2018", 12 pgs.
"U.S. Appl. No. 15/199,472, Final Office Action mailed Mar. 1, 2018", 31 pgs.
"U.S. Appl. No. 15/199,472, Final Office Action mailed Nov. 15, 2018", 37 pgs.
"U.S. Appl. No. 15/199,472, Non Final Office Action mailed Jul. 25, 2017", 30 pgs.
"U.S. Appl. No. 15/199,472, Non Final Office Action mailed Sep. 21, 2018", 33 pgs.
"U.S. Appl. No. 15/199,472, Notice of Allowability mailed May 13, 2019", 3 pgs.
"U.S. Appl. No. 15/199,472, Notice of Allowance mailed Mar. 18, 2019", 23 pgs.
"U.S. Appl. No. 15/199,472, Response filed Jan. 15, 2019 to Final Office Action mailed Nov. 15, 2018", 14 pgs.

(56) References Cited

OTHER PUBLICATIONS

"U.S. Appl. No. 15/199,472, Response filed Jan. 25, 2018 to Non Final Office Action mailed Jul. 25, 2017", 13 pgs.
"U.S. Appl. No. 15/199,472, Response filed Aug. 31, 2018 to Final Office Action mailed Mar. 1, 2018", 14 pgs.
"U.S. Appl. No. 15/199,472, Response filed Oct. 17, 2018 to Non Final Office Action mailed Sep. 31, 2018", 11 pgs.
"U.S. Appl. No. 15/365,046, Non Final Office Action mailed Dec. 20, 2018", 36 pgs.
"U.S. Appl. No. 15/365,046, Notice of Allowance mailed May 21, 2019", 14 pgs.
"U.S. Appl. No. 15/365,046, Response filed Mar. 20, 2019 to Non Final Office Action mailed Dec. 20, 2018", 20 pgs.
"U.S. Appl. No. 15/369,499, Corrected Notice of Allowability mailed Jan. 28, 2021", 3 pgs.
"U.S. Appl. No. 15/369,499, Examiner Interview Summary mailed Sep. 21, 2020", 3 pgs.
"U.S. Appl. No. 15/369,499, Examiner Interview Summary mailed Oct. 9, 2020", 2 pgs.
"U.S. Appl. No. 15/369,499, Final Office Action mailed Jan. 31, 2019", 22 pgs.
"U.S. Appl. No. 15/369,499, Final Office Action mailed Jun. 15, 2020", 17 pgs.
"U.S. Appl. No. 15/369,499, Final Office Action mailed Oct. 1, 2019", 17 pgs.
"U.S. Appl. No. 15/369,499, Non Final Office Action mailed Mar. 2, 2020", 17 pgs.
"U.S. Appl. No. 15/369,499, Non Final Office Action mailed Jun. 17, 2019", 17 pgs.
"U.S. Appl. No. 15/369,499, Non Final Office Action mailed Aug. 15, 2018", 22 pgs.
"U.S. Appl. No. 15/369,499, Notice of Allowance mailed Oct. 26, 2020", 17 pgs.
"U.S. Appl. No. 15/369,499, Response filed Feb. 3, 2020 to Final Office Action mailed Oct. 1, 2019", 10 pgs.
"U.S. Appl. No. 15/369,499, Response filed Mar. 14, 2019 to Final Office Action mailed Jan. 31, 2019", 12 pgs.
"U.S. Appl. No. 15/369,499, Response filed Jun. 2, 2020 to Non Final Office Action mailed Mar. 2, 2020", 9 pgs.
"U.S. Appl. No. 15/369,499, Response filed Sep. 15, 2020 to Final Office Action mailed Jun. 15, 2020", 10 pgs.
"U.S. Appl. No. 15/369,499, Response filed Nov. 15, 2018 to Non Final Office Action mailed Aug. 15, 2018", 10 pgs.
"U.S. Appl. No. 15/369,499, Response filed Sep. 10, 2019 to Non-Final Office Action mailed Jun. 17, 2019", 9 pgs.
"U.S. Appl. No. 15/401,926, Advisory Action mailed Mar. 11, 2020", 2 pgs.
"U.S. Appl. No. 15/401,926, Final Office Action mailed Feb. 12, 2021", 10 pgs.
"U.S. Appl. No. 15/401,926, Final Office Action mailed Nov. 21, 2019", 9 pgs.
"U.S. Appl. No. 15/401,926, Non Final Office Action mailed Mar. 30, 2020", 9 pgs.
"U.S. Appl. No. 15/401,926, Non Final Office Action mailed Aug. 6, 2019", 9 pgs.
"U.S. Appl. No. 15/401,926, Non Final Office Action mailed Oct. 27, 2020", 10 pgs.
"U.S. Appl. No. 15/401,926, Notice of Allowance mailed May 26, 2021", 8 pgs.
"U.S. Appl. No. 15/401,926, Response filed Jan. 27, 2021 to Non Final Office Action mailed Oct. 27, 2020", 9 pgs.
"U.S. Appl. No. 15/401,926, Response filed Feb. 21, 2020 to Final Office Action mailed Nov. 21, 2019", 9 pgs.
"U.S. Appl. No. 15/401,926, Response filed May 12, 2021 to Final Office Action mailed Feb. 12, 2021", 9 pgs.
"U.S. Appl. No. 15/401,926, Response filed May 20, 2019 to Restriction Requirement mailed Mar. 29, 2019", 9 pgs.
"U.S. Appl. No. 15/401,926, Response filed Jul. 30, 2020 to Non Final Office Action mailed Mar. 30, 2020", 10 pgs.
"U.S. Appl. No. 15/401,926, Response filed Nov. 6, 2019 to Non Final Office Action mailed Aug. 6, 2019", 10 pgs.
"U.S. Appl. No. 15/401,926, Restriction Requirement mailed Mar. 29, 2019", 7 pgs.
"U.S. Appl. No. 15/583,142, Jan. 28, 2019 to Response Filed Non Final Office Action mailed Oct. 25, 2018", 19 pgs.
"U.S. Appl. No. 15/583,142, Final Office Action mailed Mar. 22, 2019", 11 pgs.
"U.S. Appl. No. 15/583,142, Non Final Office Action mailed Oct. 25, 2018", 14 pgs.
"U.S. Appl. No. 15/583,142, Notice of Allowance mailed Jun. 6, 2019", 8 pgs.
"U.S. Appl. No. 15/583,142, Response filed May 9, 2019 to Final Office Action mailed Mar. 22, 2019", 8 pgs.
"U.S. Appl. No. 15/628,408, Final Office Action mailed Apr. 13, 2020", 45 pgs.
"U.S. Appl. No. 15/628,408, Final Office Action mailed Jun. 10, 2019", 44 pgs.
"U.S. Appl. No. 15/628,408, Non Final Office Action mailed Jan. 2, 2019", 28 pgs.
"U.S. Appl. No. 15/628,408, Non Final Office Action mailed Oct. 30, 2019", 45 pgs.
"U.S. Appl. No. 15/628,408, Notice of Allowance mailed Sep. 29, 2020", 13 pgs.
"U.S. Appl. No. 15/628,408, Response filed Jan. 30, 2020 to Non Final Office Action mailed Oct. 30, 2019", 17 pgs.
"U.S. Appl. No. 15/628,408, Response filed Apr. 2, 2019 to Non Final Office Action mailed Jan. 2, 2019", 15 pgs.
"U.S. Appl. No. 15/628,408, Response filed Jul. 13, 2020 to Final Office Action mailed Apr. 13, 2020", 20 pgs.
"U.S. Appl. No. 15/628,408, Response filed Aug. 12, 2019 to Final Office Action mailed Jun. 10, 2019", 12 pgs.
"U.S. Appl. No. 15/628,408, Supplemental Amendment filed Apr. 4, 2019 to Non Final Office Action mailed Jan. 2, 2019", 12 pgs.
"U.S. Appl. No. 15/661,953, Examiner Interview Summary mailed Nov. 13, 2018", 3 pgs.
"U.S. Appl. No. 15/661,953, Non Final Office Action mailed Mar. 26, 2018", 6 pgs.
"U.S. Appl. No. 15/661,953, Notice of Allowance mailed Aug. 10, 2018", 7 pgs.
"U.S. Appl. No. 15/661,953, PTO Response to Rule 312 Communication mailed Oct. 30, 2018", 2 pgs.
"U.S. Appl. No. 15/661,953, PTO Response to Rule 312 Communication mailed Nov. 7, 2018", 2 pgs.
"U.S. Appl. No. 15/661,953, Response Filed Jun. 26, 2018 to Non Final Office Action mailed Mar. 26, 2018", 13 pgs.
"U.S. Appl. No. 15/901,387, Non Final Office Action mailed Oct. 30, 2019", 40 pgs.
"U.S. Appl. No. 16/115,259, Final Office Action mailed Jul. 13, 2021", 18 pgs.
"U.S. Appl. No. 16/115,259, Final Office Action mailed Jul. 22, 2020", 20 pgs.
"U.S. Appl. No. 16/115,259, Final Office Action mailed Dec. 16, 2019", 23 pgs.
"U.S. Appl. No. 16/115,259, Non Final Office Action mailed Jan. 11, 2021", 17 pgs.
"U.S. Appl. No. 16/115,259, Non Final Office Action mailed Apr. 9, 2020", 18 pgs.
"U.S. Appl. No. 16/115,259, Non Final Office Action mailed Jul. 30, 2019", 21 pgs.
"U.S. Appl. No. 16/115,259, Non Final Office Action mailed Nov. 8, 2021", 17 pgs.
"U.S. Appl. No. 16/115,259, Preliminary Amendment filed Oct. 18, 2018 t", 6 pgs.
"U.S. Appl. No. 16/115,259, Response filed Mar. 13, 2020 to Final Office Action mailed Dec. 16, 2019", 9 pgs.
"U.S. Appl. No. 16/115,259, Response filed May 11, 2021 to Non Final Office Action mailed Jan. 11, 2021", 14 pgs.
"U.S. Appl. No. 16/115,259, Response filed Jul. 9, 2020 to Non Final Office Action mailed Apr. 9, 2020", 8 pgs.
"U.S. Appl. No. 16/115,259, Response filed Oct. 13, 2021 to Final Office Action mailed Jul. 13, 2021", 10 pgs.

(56) References Cited

OTHER PUBLICATIONS

"U.S. Appl. No. 16/115,259, Response filed Oct. 22, 2020 to Final Office Action mailed Jul. 22, 2020", 10 pgs.
"U.S. Appl. No. 16/115,259, Response filed Oct. 30, 2019 to Non Final Office Action mailed Jul. 30, 2019", 9 pgs.
"U.S. Appl. No. 16/126,869, Final Office Action mailed Feb. 8, 2021", 8 pgs.
"U.S. Appl. No. 16/126,869, Final Office Action mailed Jul. 7, 2020", 8 pgs.
"U.S. Appl. No. 16/126,869, Non Final Office Action mailed Feb. 5, 2020", 7 pgs.
"U.S. Appl. No. 16/126,869, Non Final Office Action mailed May 19, 2021", 8 pgs.
"U.S. Appl. No. 16/126,869, Non Final Office Action mailed Oct. 30, 2020", 9 pgs.
"U.S. Appl. No. 16/126,869, Response filed Feb. 1, 2021 to Non Final Office Action mailed Oct. 30, 2020", 9 pgs.
"U.S. Appl. No. 16/126,869, Response filed May 5, 2020 to Non Final Office Action mailed Feb. 5, 2020", 8 pgs.
"U.S. Appl. No. 16/126,869, Response filed May 10, 2021 to Final Office Action mailed Feb. 8, 2021", 10 pgs.
"U.S. Appl. No. 16/126,869, Response filed Aug. 19, 2021 to Non Final Office Action mailed May 19, 2021", 10 pgs.
"U.S. Appl. No. 16/126,869, Response filed Oct. 7, 2020 to Final Office Action mailed Jul. 7, 2020", 10 pgs.
"U.S. Appl. No. 16/193,938, Final Office Action mailed Aug. 28, 2020", 10 pgs.
"U.S. Appl. No. 16/193,938, Non Final Office Action mailed Jan. 16, 2020", 11 pgs.
"U.S. Appl. No. 16/193,938, Preliminary Amendment filed Nov. 27, 2018", 7 pgs.
"U.S. Appl. No. 16/193,938, Response filed Mar. 24, 2020 to Non Final Office Action mailed Jan. 16, 2020", 10 pgs.
"U.S. Appl. No. 16/193,938, Response filed Nov. 30, 2020 to Final Office Action mailed Aug. 28, 2020", 9 pgs.
"U.S. Appl. No. 16/365,300, Final Office Action mailed May 13, 2020", 44 pgs.
"U.S. Appl. No. 16/365,300, Non Final Office Action mailed Sep. 28, 2020", 40 pgs.
"U.S. Appl. No. 16/365,300, Non Final Office Action mailed Oct. 30, 2019", 40 pgs.
"U.S. Appl. No. 16/365,300, Response filed Jan. 30, 2020 to Non Final Office Action mailed Oct. 30, 2019", 16 pgs.
"U.S. Appl. No. 16/365,300, Response filed Aug. 13, 2020 to Final Office Action mailed May 13, 2020", 16 pgs.
"U.S. Appl. No. 16/409,390, Final Office Action mailed Jun. 15, 2020", 12 pgs.
"U.S. Appl. No. 16/409,390, Non Final Office Action mailed Jan. 8, 2020", 14 pgs.
"U.S. Appl. No. 16/409,390, Non Final Office Action mailed Sep. 11, 2020", 15 pgs.
"U.S. Appl. No. 16/409,390, Response filed Apr. 2, 2020 to Non Final Office Action mailed Jan. 8, 2020", 10 pgs.
"U.S. Appl. No. 16/409,390, Response filed Aug. 5, 2020 to Final Office Action mailed Jun. 15, 2020", 11 pgs.
"U.S. Appl. No. 16/433,725, Examiner Interview Summary mailed Jul. 20, 2020", 4 pgs.
"U.S. Appl. No. 16/433,725, Final Office Action mailed Jun. 2, 2020", 29 pgs.
"U.S. Appl. No. 16/433,725, Non Final Office Action mailed Feb. 27, 2020", 34 pgs.
"U.S. Appl. No. 16/433,725, Non Final Office Action mailed Aug. 20, 2020", 29 pgs.
"U.S. Appl. No. 16/433,725, Response filed May 8, 2020 to Non Final Office Action mailed Feb. 27, 2020", 13 pgs.
"U.S. Appl. No. 16/433,725, Response filed Aug. 3, 2020 to Final Office Action mailed Jun. 2, 2020", 12 pgs.
"U.S. Appl. No. 16/433,725, Response filed Nov. 16, 2020 to Non Final Office Action mailed Aug. 20, 2020", 12 pgs.
"U.S. Appl. No. 16/552,003, Notice of Allowance mailed Aug. 27, 2020", 15 pgs.
"U.S. Appl. No. 16/563,445, Non Final Office Action mailed Sep. 29, 2020", 11 pgs.
"U.S. Appl. No. 17/247,169, Corrected Notice of Allowability mailed Jul. 9, 2021", 2 pgs.
"U.S. Appl. No. 17/247,169, Corrected Notice of Allowability mailed Oct. 15, 2021", 7 pgs.
"U.S. Appl. No. 17/247,169, Corrected Notice of Allowability mailed Nov. 30, 2021", 2 pgs.
"U.S. Appl. No. 17/247,169, Notice of Allowance mailed Jul. 2, 2021", 14 pgs.
"U.S. Appl. No. 17/247,169, Preliminary Amendment filed Feb. 2, 2021", 7 pgs.
"European Application Serial No. 17751497.3, Response filed May 20, 2019 to Communication pursuant to Rules 161(1) and 162 EPC mailed Feb. 14, 2019", w/ English Claims, 24 pgs.
"European Application Serial No. 17776809.0, Communication Pursuant to Article 94(3) EPC mailed Dec. 9, 2019", 4 pgs.
"European Application Serial No. 17776809.0, Extended European Search Report mailed Feb. 27, 2019", 7 pgs.
"European Application Serial No. 17776809.0, Response filed Mar. 19, 2020 to Communication Pursuant to Article 94(3) EPC mailed Dec. 9, 2019", 25 pgs.
"European Application Serial No. 17876226.6, Communication Pursuant to Article 94(3) EPC mailed May 29, 2020", 5 pgs.
"European Application Serial No. 17876226.6, Extended European Search Report mailed Sep. 5, 2019", 10 pgs.
"European Application Serial No. 17876226.6, Response filed Mar. 30, 2020 to Extended European Search Report mailed Sep. 5, 2019", 22 pgs.
"European Application Serial No. 17876226.6, Response filed Oct. 2, 2020 to Communication Pursuant to Article 94(3) EPC mailed May 29, 2020", 22 pgs.
"European Application Serial No. 18791925.3, Extended European Search Report mailed Jan. 2, 2020", 6 pgs.
"European Application Serial No. 18791925.3, Response Filed Jul. 27, 2020 to Extended European Search Report mailed Jan. 2, 2020", 19 pgs.
"International Application Serial No. PCT/CA2013/000454, International Preliminary Report on Patentability mailed Nov. 20, 2014", 9 pgs.
"International Application Serial No. PCT/CA2013/000454, International Search Report mailed Aug. 20, 2013", 3 pgs.
"International Application Serial No. PCT/CA2013/000454, Written Opinion mailed Aug. 20, 2013", 7 pgs.
"International Application Serial No. PCT/US2017/025460, International Preliminary Report on Patentability mailed Oct. 11, 2018", 9 pgs.
"International Application Serial No. PCT/US2017/025460, International Search Report mailed Jun. 20, 2017", 2 pgs.
"International Application Serial No. PCT/US2017/025460, Written Opinion mailed Jun. 20, 2017", 7 pgs.
"International Application Serial No. PCT/US2017/040447, International Preliminary Report on Patentability mailed Jan. 10, 2019", 8 pgs.
"International Application Serial No. PCT/US2017/040447, International Search Report mailed Oct. 2, 2017", 4 pgs.
"International Application Serial No. PCT/US2017/040447, Written Opinion mailed Oct. 2, 2017", 6 pgs.
"International Application Serial No. PCT/US2017/057918, International Preliminary Report on Patentability mailed May 9, 2019", 9 pgs.
"International Application Serial No. PCT/US2017/057918, International Search Report mailed Jan. 19, 2018", 3 pgs.
"International Application Serial No. PCT/US2017/057918, Written Opinion mailed Jan. 19, 2018", 7 pgs.
"International Application Serial No. PCT/US2017/063981, International Preliminary Report on Patentability mailed Jun. 13, 2019", 10 pgs.
"International Application Serial No. PCT/US2017/063981, International Search Report mailed Mar. 22, 2018", 3 pgs.

(56) References Cited

OTHER PUBLICATIONS

"International Application Serial No. PCT/US2017/063981, Written Opinion mailed Mar. 22, 2018", 8 pgs.
"International Application Serial No. PCT/US2018/000112, International Preliminary Report on Patentability mailed Nov. 7, 2019", 6 pgs.
"International Application Serial No. PCT/US2018/000112, International Search Report mailed Jul. 20, 2018", 2 pgs.
"International Application Serial No. PCT/US2018/000112, Written Opinion mailed Jul. 20, 2018", 4 pgs.
"International Application Serial No. PCT/US2018/000113, International Search Report mailed Jul. 13, 2018", 2 pgs.
"International Application Serial No. PCT/US2018/000113, Written Opinion mailed Jul. 13, 2018", 4 pgs.
"International Application Serial No. PCT/US2018/030039, International Search Report mailed Jul. 11, 2018", 2 pgs.
"International Application Serial No. PCT/US2018/030039, Written Opinion mailed Jul. 11, 2018", 4 pgs.
"International Application Serial No. PCT/US2018/030043, International Search Report mailed Jul. 23, 2018", 2 pgs.
"International Application Serial No. PCT/US2018/030043, Written Opinion mailed Jul. 23, 2018", 5 pgs.
"International Application Serial No. PCT/US2018/030044, International Preliminary Report on Patentability mailed Nov. 7, 2019", 8 pgs.
"International Application Serial No. PCT/US2018/030044, International Search Report mailed Jun. 26, 2018", 2 pgs.
"International Application Serial No. PCT/US2018/030044, Written Opinion mailed Jun. 26, 2018", 6 pgs.
"International Application Serial No. PCT/US2018/030045, International Search Report mailed Jul. 3, 2018", 2 pgs.
"International Application Serial No. PCT/US2018/030045, Written Opinion mailed Jul. 3, 2018", 6 pgs.
"International Application Serial No. PCT/US2018/030046, International Search Report mailed Jul. 6, 2018", 2 pgs.
"International Application Serial No. PCT/US2018/030046, Written Opinion mailed Jul. 6, 2018", 6 pgs.
"Introducing Google Latitude", Google UK, [Online] Retrieved from the Internet: <URL: https://www.youtube.com/watch?v=XecGMKqiA5A>, [Retrieved on: Oct. 23, 2019], (Feb. 3, 2009), 1 pg.
"Korean Application Serial No. 10-2018-7031055, Notice of Preliminary Rejection mailed Aug. 6, 2019", w/ English Translation, 13 pgs.
"Korean Application Serial No. 10-2018-7031055, Office Action mailed Feb. 25, 2020", w/ English Translation, 7 pgs.
"Korean Application Serial No. 10-2018-7031055, Response filed Mar. 27, 2020 to Office Action mailed Feb. 25, 2020", w/ English claims, 24 pgs.
"Korean Application Serial No. 10-2018-7031055, Response filed Oct. 7, 2019 to Notice of Preliminary Rejection mailed Aug. 6, 2019", w/ English Claims, 30 pgs.
"Korean Application Serial No. 10-2019-7002736, Notice of Preliminary Rejection mailed May 25, 2020", W/English Translation, 16 pgs.
"Korean Application Serial No. 10-2019-7002736, Response filed Jul. 9, 2020 to Notice of Preliminary Rejection mailed May 25, 2020", w/ English Claims, 29 pgs.
"Korean Application Serial No. 10-2019-7014555, Notice of Preliminary Rejection mailed Jul. 20, 2020", w/ English Translation, 12 pgs.
"Korean Application Serial No. 10-2019-7014555, Response filed Oct. 6, 2020 to Notice of Preliminary Rejection mailed Jul. 20, 2020", w/ English Claims, 27 pgs.
"Korean Application Serial No. 10-2019-7018501, Final Office Action mailed Sep. 8, 2020", w/ English translation, 9 pgs.
"Korean Application Serial No. 10-2019-7018501, Notice of Preliminary Rejection mailed Apr. 16, 2020", w/ English Translation, 20 pgs.
"Korean Application Serial No. 10-2019-7018501, Response filed Jun. 16, 2020 to Notice of Preliminary Rejection mailed Apr. 16, 2020", w/ English Claims, 17 pgs.
"Korean Application Serial No. 10-2019-7018501, Response filed Dec. 7, 2020 to Final Office Action mailed Sep. 8, 2020", w/ English Claims, 27 pgs.
"Korean Application Serial No. 10-2020-7022773, Notice of Preliminary Rejection mailed Aug. 23, 2020", w/ English translation, 11 pgs.
"Korean Application Serial No. 10-2020-7022773, Response filed Oct. 19, 2020 to Notice of Preliminary Rejection mailed Aug. 23, 2020", w/ English Claims, 26 pgs.
"Korean Application Serial No. 10-2020-7035136, Notice of Preliminary Rejection mailed Feb. 25, 2021", w/ English Translation, 5 pgs.
"Korean Application Serial No. 10-2021-7008607, Notice of Preliminary Rejection mailed Jun. 1, 2021", w/ English Translation, 5 pgs.
"Korean Application Serial No. 10-2021-7008607, Response filed Aug. 2, 2021 to Notice of Preliminary Rejection mailed Jun. 1, 2021", w/ English Claims, 17 pgs.
"Korean Application Serial No. 10-2021-7014438, Notice of Preliminary Rejection mailed Aug. 9, 2021", w/ English Translation, 4 pgs.
"List of IBM Patents or Patent Applications Treated as Related; {Appendix P}", IBM, (Sep. 14, 2018), 2 pgs.
Alex, Heath, "What do Snapchat's emojis mean?—Understanding these emojis will turn you into a Snapchat pro", Business Insider, [Online] Retrieved from the Internet : <URL: https://www.businessinsider.com/what-do-snapchats-emojismean-2016-5?international=true&r=US&IR=T>, (May 28, 2016), 1 pg.
Broderick, Ryan, "Every thing You Need to Know About Japan's Amazing Photo Booths", [Online] Retrieved from the Internet: <URL: https://www.buzzfeed.com/ryanhatesthis/look-how-kawaii-i-am?utm_term =.kra5QwGNZ#.muYoVB7qJ>, (Jan. 22, 2016), 30 pgs.
Chan, Connie, "The Elements of Stickers", [Online] Retrieved from the Internet: <URL: https://a16z.com/2016/06/17/stickers/>, (Jun. 20, 2016), 15 pgs.
Collet, Jean Luc, et al., "Interactive avatar in messaging environment", U.S. Appl. No. 12/471,811, filed May 26, 2009, (May 26, 2009), 31 pgs.
Dillet, Romain, "Zenly proves that location sharing isn't dead", [Online] Retrieved from the Internet: <URL: https://techcrunch.com/2016/05/19/zenly-solomoyolo/>, (accessed Jun. 27, 2018), 6 pgs.
Finn, Greg, "Miss Google Latitude? Google Plus With Location Sharing Is Now A Suitable Alternative", Cypress North, [Online] Retrieved from the Internet: <URL: https://cypressnorth.com/social-media/miss-google-latitude-google-location-sharing-now-suitable-alternative/>, [Retrieved on: Oct. 24, 2019], (Nov. 27, 2013), 10 pgs.
Gundersen, Eric, "Foursquare Switches to MapBox Streets, Joins the OpenStreetMap Movement", [Online] Retrieved from the Internet: <URL: https://blog.mapbox.com/foursquare-switches-to-mapbox-streets-joins-the-openstreetmap-movement-29e6a17f4464>, (Mar. 6, 2012), 4 pgs.
Karen, Tumbokon, "Snapchat Update: How To Add Bitmoji To Customizable Geofilters", International Business Times, [Online] Retrieved from the Internet : <URL: https://www.ibtimes.com/snapchat-update-how-add-bitmojicustomizable-geofilters-2448152>, (Nov. 18, 2016), 6 pgs.
Lapenna, Joe, "The Official Google Blog. Check in with Google Latitude", Google Blog, [Online] Retrieved from the Internet: <https://web.archive.org/web/20110201201006/https://googleblog.blogspot.com/2011/02/check-in-with-google-latitude.html>, [Retrieved on: Oct. 23, 2019], (Feb. 1, 2011), 6 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

(56) References Cited

OTHER PUBLICATIONS

Neis, Pascal, "The OpenStreetMap Contributors Map aka Who's around me?", [Online] Retrieved from the Internet by the examiner on Jun. 5, 2019: <URL: https://neis-one.org/2013/01/oooc/>, (Jan. 6, 2013), 7 pgs.
Perez, Sarah, "Life 360, The Family Locator With More Users Than Foursquare, Raises A $10 Million Series B", [Online] Retrieved from the Internet: <URL: https://techcrunch.com/2013/07/10/life360-the-family-locator-with-more-users-than-foursquare-raises-10-million-series-b/>, (Jul. 10, 2013), 2 pgs.
Petovello, Mark, "How does a GNSS receiver estimate velocity?", InsideGNSS, [Online] Retrieved from the Internet: <URL: http://insidegnss.com/wp-content/uploads/2018/01/marapr15-SOLUTIONS.pdf>., (Mar.-Apr. 2015), 3 pgs.
Rhee, Chi-Hyoung, et al., "Cartoon-like Avatar Generation Using Facial Component Matching", International Journal of Multimedia and Ubiquitous Engineering, (Jul. 30, 2013), 69-78.
Sophia, Bernazzani, "A Brief History of Snapchat", Hubspot, [Online] Retrieved from the Internet : <URL: https://blog.hubspot.com/marketing/history-of-snapchat>, (Feb. 10, 2017), 12 pgs.
Sulleyman, Aatif, "Google Maps Could Let Strangers Track Your Real-Time Location For Days At A Time", The Independent, [Online] Retrieved from the Internet: <URL: https://www.independent.co.uk/life-style/gadgets-and-tech/news/google-maps-track-location-real-time-days-privacy-security-stalk-gps-days-a7645721.html>, (Mar. 23, 2017), 5 pgs.
Zibreg, "How to share your real time location on Google Maps", idownloadblog.com, [Online] Retrieved from the Internet: <URL: https://www.idownloadblog.com/2017/04/12/how-to-share-location-google-maps/>, [Retrieved on: Oct. 23, 2019], (Apr. 12, 2017), 23 pgs.
"A Whole New Story", Snap, Inc., [Online] Retrieved from the Internet: <URL: https://www.snap.com/en-us/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"U.S. Appl. No. 15/401,926, Corrected Notice of Allowability mailed Nov. 15, 2021", 2 pgs.
"U.S. Appl. No. 15/401,926, Corrected Notice of Allowability mailed Nov. 16, 2021", 2 pgs.
"U.S. Appl. No. 15/401,926, Corrected Notice of Allowability mailed Dec. 22, 2021", 2 pgs.
"U.S. Appl. No. 15/628,408, Corrected Notice of Allowability mailed Jul. 21, 2021", 7 pgs.
"U.S. Appl. No. 15/628,408, Notice of Allowance mailed Jul. 8, 2021", 11 pgs.
"U.S. Appl. No. 15/859,101, Examiner Interview Summary mailed Sep. 18, 2018", 3 pgs.
"U.S. Appl. No. 15/859,101, Non Final Office Action mailed Jun. 15, 2018", 10 pgs.
"U.S. Appl. No. 15/859,101, Notice of Allowance mailed Oct. 4, 2018", 9 pgs.
"U.S. Appl. No. 15/859,101, Response filed Sep. 17, 2018 to Non Final Office Action mailed Jun. 15, 2018", 17 pgs.
"U.S. Appl. No. 15/965,361, Non Final Office Action mailed Jun. 22, 2020", 35 pgs.
"U.S. Appl. No. 15/965,744, Examiner Interview Summary mailed Feb. 21, 2020", 3 pgs.
"U.S. Appl. No. 15/965,744, Final Office Action mailed Feb. 6, 2020", 19 pgs.
"U.S. Appl. No. 15/965,744, Non Final Office Action mailed Feb. 1, 2021", 29 pgs.
"U.S. Appl. No. 15/965,744, Non Final Office Action mailed Jun. 12, 2019", 18 pgs.
"U.S. Appl. No. 15/965,744, Response filed Jun. 8, 2020 to Final Office Action mailed Feb. 6, 2020", 11 pgs.
"U.S. Appl. No. 15/965,744, Response filed Nov. 12, 2019 to Non Final Office Action mailed Jun. 12, 2019", 10 pgs.
"U.S. Appl. No. 15/965,749, Examiner Interview Summary mailed Jul. 29, 2020", 3 pgs.
"U.S. Appl. No. 15/965,749, Final Office Action mailed Jun. 11, 2020", 12 pgs.
"U.S. Appl. No. 15/965,749, Non Final Office Action mailed Jan. 27, 2020", 9 pgs.
"U.S. Appl. No. 15/965,749, Non Final Office Action mailed Jul. 10, 2019", 8 pgs.
"U.S. Appl. No. 15/965,749, Non Final Office Action mailed Nov. 30, 2020", 13 pgs.
"U.S. Appl. No. 15/965,749, Response filed Feb. 28, 2020 to Non Final Office Action mailed Jan. 27, 2020", 12 pgs.
"U.S. Appl. No. 15/965,749, Response filed Oct. 10, 2019 to Non-Final Office Action mailed Jul. 10, 2019", 11 pgs.
"U.S. Appl. No. 15/965,749, Response filed Oct. 12, 2020 to Final Office Action mailed Jun. 11, 2020", 14 pgs.
"U.S. Appl. No. 15/965,754, Corrected Notice of Allowability mailed Jan. 6, 2021", 2 pgs.
"U.S. Appl. No. 15/965,754, Corrected Notice of Allowability mailed Mar. 1, 2021", 2 pgs.
"U.S. Appl. No. 15/965,754, Final Office Action mailed Jul. 17, 2020", 14 pgs.
"U.S. Appl. No. 15/965,754, Non Final Office Action mailed Mar. 30, 2020", 13 pgs.
"U.S. Appl. No. 15/965,754, Notice of Allowance mailed Nov. 16, 2020", 7 pgs.
"U.S. Appl. No. 15/965,754, Response filed Jun. 30, 2020 to Non Final Office Action mailed Mar. 30, 2020", 12 pgs.
"U.S. Appl. No. 15/965,754, Response filed Oct. 19, 2020 to Final Office Action mailed Jul. 17, 2020", 14 pgs.
"U.S. Appl. No. 15/965,754, Supplemental Notice of Allowability mailed Dec. 16, 2020", 2 pgs.
"U.S. Appl. No. 15/965,756, Non Final Office Action mailed Jan. 13, 2021", 16 pgs.
"U.S. Appl. No. 15/965,756, Non Final Office Action mailed Jun. 24, 2020", 16 pgs.
"U.S. Appl. No. 15/965,756, Response filed Sep. 24, 2020 to Non Final Office Action mailed Jun. 24, 2020", 11 pgs.
"U.S. Appl. No. 15/965,764, Examiner Interview Summary mailed Aug. 6, 2020", 3 pgs.
"U.S. Appl. No. 15/965,764, Final Office Action mailed May 14, 2020", 18 pgs.
"U.S. Appl. No. 15/965,764, Non Final Office Action mailed Jan. 2, 2020", 18 pgs.
"U.S. Appl. No. 15/965,764, Non Final Office Action mailed Feb. 22, 2021", 18 pgs.
"U.S. Appl. No. 15/965,764, Response filed Apr. 2, 2020 to Non Final Office Action mailed Jan. 2, 2020", 11 pgs.
"U.S. Appl. No. 15/965,764, Response filed Oct. 14, 2020 to Final Office Action mailed May 14, 2020", 11 pgs.
"U.S. Appl. No. 15/965,775, Final Office Action mailed Jan. 30, 2020", 10 pgs.
"U.S. Appl. No. 15/965,775, Non Final Office Action mailed Jun. 19, 2020", 12 pgs.
"U.S. Appl. No. 15/965,775, Non Final Office Action mailed Jul. 29, 2019", 8 pgs.
"U.S. Appl. No. 15/965,775, Non Final Office Action mailed Oct. 16, 2020", 11 pgs.
"U.S. Appl. No. 15/965,775, Response filed Mar. 16, 2021 to Non Final Office Action mailed Oct. 16, 2020", 10 pgs.
"U.S. Appl. No. 15/965,775, Response filed Jun. 1, 2020 to Final Office Action mailed Jan. 30, 2020", 10 pgs.
"U.S. Appl. No. 15/965,775, Response filed Jul. 7, 2020 to Non Final Office Action mailed Jun. 19, 2020", 9 pgs.
"U.S. Appl. No. 15/965,775, Response filed Oct. 29, 2019 to Non Final Office Action mailed Jul. 29, 2019", 10 pgs.
"U.S. Appl. No. 15/965,811, Final Office Action mailed Feb. 12, 2020", 16 pgs.
"U.S. Appl. No. 15/965,811, Non Final Office Action mailed Jun. 26, 2020", 20 pgs.
"U.S. Appl. No. 15/965,811, Non Final Office Action mailed Aug. 8, 2019", 15 pgs.

(56) References Cited

OTHER PUBLICATIONS

"U.S. Appl. No. 15/965,811, Response filed Jun. 12, 2020 to Final Office Action mailed Feb. 12, 2020", 13 pgs.
"U.S. Appl. No. 15/965,811, Response filed Nov. 8, 2019 to Non Final Office Action mailed Aug. 8, 2019", 14 pgs.
"U.S. Appl. No. 16/115,259, Final Office Action mailed Apr. 4, 2022", 18 pgs.
"U.S. Appl. No. 16/115,259, Response filed Feb. 8, 2022 to Non Final Office Action mailed Nov. 8, 2021", 9 pgs.
"U.S. Appl. No. 16/126,869, Final Office Action mailed Nov. 29, 2021", 9 pgs.
"U.S. Appl. No. 16/126,869, Pre-Appeal Brief Request for Review filed Mar. 29, 2022", 4 pgs.
"U.S. Appl. No. 16/193,938, Advisory Action mailed Aug. 17, 2021", 2 pgs.
"U.S. Appl. No. 16/193,938, Final Office Action mailed Jun. 10, 2021", 11 pgs.
"U.S. Appl. No. 16/193,938, Non Final Office Action mailed Feb. 24, 2021", 10 pgs.
"U.S. Appl. No. 16/193,938, Response filed May 24, 2021 to Non Final Office Action mailed Feb. 24, 2021", 9 pgs.
"U.S. Appl. No. 16/193,938, Response filed Aug. 10, 2021 to Final Office Action mailed Jun. 10, 2021", 10 pgs.
"U.S. Appl. No. 16/232,824, Examiner Interview Summary mailed Jul. 24, 2020", 3 pgs.
"U.S. Appl. No. 16/232,824, Final Office Action mailed Apr. 30, 2020", 19 pgs.
"U.S. Appl. No. 16/232,824, Non Final Office Action mailed Feb. 19, 2021", 28 pgs.
"U.S. Appl. No. 16/232,824, Non Final Office Action mailed Oct. 21, 2019", 18 pgs.
"U.S. Appl. No. 16/232,824, Response filed Feb. 21, 2020 to Non Final Office Action mailed Oct. 21, 2019", 9 pgs.
"U.S. Appl. No. 16/232,824, Response filed Jul. 15, 2020 to Final Office Action mailed Apr. 30, 2020", 11 pgs.
"U.S. Appl. No. 16/245,660, Final Office Action mailed Feb. 6, 2020", 12 pgs.
"U.S. Appl. No. 16/245,660, Non Final Office Action mailed Jun. 27, 2019", 11 pgs.
"U.S. Appl. No. 16/245,660, Notice of Allowability mailed Nov. 18, 2020", 2 pgs.
"U.S. Appl. No. 16/245,660, Notice of Allowance mailed Jul. 8, 2020", 8 pgs.
"U.S. Appl. No. 16/245,660, Notice of Allowance mailed Nov. 3, 2020", 8 pgs.
"U.S. Appl. No. 16/245,660, Response filed Jun. 8, 2020 to Final Office Action mailed Feb. 6, 2020", 16 pgs.
"U.S. Appl. No. 16/245,660, Response filed Nov. 6, 2019 to Non Final Office Action mailed Jun. 27, 2019", 11 pgs.
"U.S. Appl. No. 16/365,300, Final Office Action mailed Apr. 15, 2021", 31 pgs.
"U.S. Appl. No. 16/365,300, Non Final Office Action mailed Aug. 3, 2021", 29 pgs.
"U.S. Appl. No. 16/365,300, Response filed Jan. 28, 2021 to Non Final Office Action mailed Sep. 28, 2020", 17 pgs.
"U.S. Appl. No. 16/365,300, Response filed Jul. 15, 2021 to Final Office Action mailed Apr. 15, 2021", 11 pgs.
"U.S. Appl. No. 16/409,390, Corrected Notice of Allowability mailed May 19, 2021", 4 pgs.
"U.S. Appl. No. 16/409,390, Final Office Action mailed Dec. 23, 2020", 15 pgs.
"U.S. Appl. No. 16/409,390, Notice of Allowance mailed Feb. 22, 2021", 7 pgs.
"U.S. Appl. No. 16/409,390, Response filed Feb. 8, 2021 to Final Office Action mailed Dec. 23, 2020", 11 pgs.
"U.S. Appl. No. 16/409,390, Response filed Dec. 8, 2020 to Non Final Office Action mailed Sep. 11, 2020", 12 pgs.
"U.S. Appl. No. 16/433,725, Notice of Allowance mailed Dec. 16, 2020", 8 pgs.

"U.S. Appl. No. 16/433,725, Supplemental Notice of Allowability mailed Jan. 25, 2021", 2 pgs.
"U.S. Appl. No. 16/563,445, Final Office Action mailed Mar. 8, 2021", 11 pgs.
"U.S. Appl. No. 16/563,445, Non Final Office Action mailed Aug. 20, 2021", 15 pgs.
"U.S. Appl. No. 16/563,445, Response filed Jan. 29, 2021 to Non Final Office Action mailed Sep. 29, 2020", 9 pgs.
"U.S. Appl. No. 16/563,445, Response filed Jun. 8, 2021 to Final Office Action mailed Mar. 8, 2021", 8 pages.
"U.S. Appl. No. 17/314,963, Non Final Office Action mailed Feb. 2, 2022", 24 pgs.
"U.S. Appl. No. 17/314,963, Response filed May 2, 2022 to Non Final Office Action mailed Feb. 2, 2022", 10 pgs.
"U.S. Appl. No. 17/450,040, Preliminary Amendment filed Jan. 19, 2022", 7 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 19206595.1, Extended European Search Report mailed Mar. 31, 2020", 6 pgs.
"European Application Serial No. 17751497.3, Communication Pursuant to Article 94(3) EPC mailed Jun. 2, 2021", 4 pgs.
"European Application Serial No. 17776809.0, Communication Pursuant to Article 94(3) EPC mailed Apr. 23, 2021", 4 pgs.
"European Application Serial No. 17776809.0, Response filed Aug. 20, 2021 to Communication Pursuant to Article 94(3) EPC mailed Apr. 23, 2021", 7 pgs.
"European Application Serial No. 17876226.6, Communication Pursuant to Article 94(3) EPC mailed Dec. 14, 2021", 4 pgs.
"European Application Serial No. 18789872.1, Communication Pursuant to Article 94(3) EPC mailed Aug. 11, 2020", 6 pgs.
"European Application Serial No. 18789872.1, Extended European Search Report mailed Jan. 2, 2020", 8 pgs.
"European Application Serial No. 18789872.1, Response filed Feb. 18, 2021 to Communication Pursuant to Article 94(3) EPC mailed Aug. 11, 2020", 15 pgs.
"European Application Serial No. 18790189.7, Communication Pursuant to Article 94(3) EPC mailed Jul. 30, 2020", 9 pgs.
"European Application Serial No. 18790189.7, Extended European Search Report mailed Jan. 2, 2020", 7 pgs.
"European Application Serial No. 18790189.7, Response filed Feb. 9, 2021 to Communication Pursuant to Article 94(3) EPC mailed Jul. 30, 2020", 11 pgs.
"European Application Serial No. 18790189.7, Response Filed Jul. 14, 2020 to Extended European Search Report mailed Jan. 2, 2020", 21 pgs.
"European Application Serial No. 18790319.0, Extended European Search Report mailed Feb. 12, 2020", 6 pgs.
"European Application Serial No. 18790319.0, Response filed Aug. 27, 2020 to Extended European Search Report mailed Feb. 12, 2020", 19 pgs.
"European Application Serial No. 18791363.7, Communication Pursuant to Article 94(3) EPC mailed Aug. 11, 2020", 9 pgs.
"European Application Serial No. 18791363.7, Extended European Search Report mailed Jan. 2, 2020", 8 pgs.
"European Application Serial No. 18791363.7, Response filed Jul. 14, 2020 to Extended European Search Report mailed Jan. 2, 2020", 31 pgs.
"European Application Serial No. 18791925.3, Communication Pursuant to Article 94(3) EPC mailed May 11, 2021", 7 pgs.
"European Application Serial No. 19206595.1, Response filed Dec. 16, 2020 to Extended European Search Report mailed Mar. 31, 2020", 43 pgs.
"European Application Serial No. 19206610.8, Extended European Search Report mailed Feb. 12, 2020", 6 pgs.

(56) References Cited

OTHER PUBLICATIONS

"European Application Serial No. 19206610.8, Response filed Sep. 23, 2020 to Extended European Search Report mailed Feb. 12, 2020", 109 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2018/000113, International Preliminary Report on Patentability mailed Nov. 7, 2019", 6 pgs.
"International Application Serial No. PCT/US2018/030039, International Preliminary Report on Patentability mailed Nov. 7, 2019", 6 pgs.
"International Application Serial No. PCT/US2018/030041, International Preliminary Report on Patentability mailed Nov. 7, 2019", 5 pgs.
"International Application Serial No. PCT/US2018/030041, International Search Report mailed Jul. 11, 2018", 2 pgs.
"International Application Serial No. PCT/US2018/030041, Written Opinion mailed Jul. 11, 2018", 3 pgs.
"International Application Serial No. PCT/US2018/030043, International Preliminary Report on Patentability mailed Nov. 7, 2019", 7 pgs.
"International Application Serial No. PCT/US2018/030045, International Preliminary Report on Patentability mailed Nov. 7, 2019", 8 pgs.
"International Application Serial No. PCT/US2018/030046, International Preliminary Report on Patentability mailed Nov. 7, 2019", 8 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2019-7002736, Final Office Action mailed Nov. 26, 2020", w/ English Translation, 8 pgs.
"Korean Application Serial No. 10-2019-7002736, Response filed Dec. 28, 2020 to Final Office Action mailed Nov. 26, 2020", w/ English Claims, 16 pgs.
"Korean Application Serial No. 10-2019-7034899, Notice of Preliminary Rejection mailed May 27, 2021", With English translation, 17 pgs.
"Korean Application Serial No. 10-2019-7034899, Response filed Aug. 11, 2021 to Notice of Preliminary Rejection mailed May 27, 2021", With English claims, 26 pgs.
"Korean Application Serial No. 10-2020-7022773, Notice of Preliminary Rejection mailed Feb. 26, 2021", w/ English Translation, 11 pgs.
"Korean Application Serial No. 10-2020-7022773, Response filed Apr. 7, 2021 to Notice of Preliminary Rejection mailed Feb. 26, 2021", w/ English Claims, 12 pgs.
"Korean Application Serial No. 10-2021-7008607, Notice of Preliminary Rejection mailed Dec. 7, 2021", w/ English translation, 6 pgs.
"Korean Application Serial No. 10-2021-7008607, Response filed Jan. 11, 2022 to Notice of Preliminary Rejection mailed Dec. 7, 2021", w/English Claims, 12 pgs.
"Korean Application Serial No. 10-2021-7010821, Notice of Preliminary Rejection mailed May 28, 2021", w/ English Translation, 18 pgs.
"Korean Application Serial No. 10-2021-7010821, Response filed Jul. 28, 2021 to Notice of Preliminary Rejection mailed May 28, 2021", w/ English Claims, 31 pgs.
"Korean Application Serial No. 10-2021-7014438, Response filed Oct. 12, 2021 to Notice of Preliminary Rejection mailed Aug. 9, 2021", w/ English Claims, 15 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"The One Million Tweet Map: Using Maptimize to Visualize Tweets in a World Map | PowerPoint Presentation", fppt.com, [Online] Retrieved form the Internet: <URL: https://web.archive.org/web/20121103231906/http://www.freepower-point-templates.com/articles/the-one-million-tweet-mapusing-maptimize-to-visualize-tweets-in-a-world-map/>, (Nov. 3, 2012), 6 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

(56) References Cited

OTHER PUBLICATIONS

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
Wilmott, Clancy, et al., "Playful Mapping in the Digital Age", Playful Mapping Collective, Institute of Network Cultures, Amsterdam, (2016), 158 pgs.
"European Application Serial No. 17876226.6, Response Filed Apr. 22, 2022 Communication Pursuant to Article 94(3) EPC mailed Dec. 14, 2021", 16 pgs.
"U.S. Appl. No. 16/126,869, Decision on Pre-Appeal Brief Request for Review mailed May 13, 2022", 2 pgs.
"U.S. Appl. No. 17/314,963, Final Office Action mailed Jul. 11, 2022", 25 pgs.
"Korean Application Serial No. 10-2022-7015893, Notice of Preliminary Rejection mailed Aug. 11, 2022", w/ English Translation, 6 pgs.
"U.S. Appl. No. 16/115,259, Response filed Sep. 6, 2022 to Final Office Action mailed Apr. 4, 2022", 10 pgs.
"U.S. Appl. No. 17/314,963, Response filed Sep. 12, 2022 to Final Office Action mailed Jul. 11, 2022", 11 pgs.
"U.S. Appl. No. 16/126,869, Appeal Brief filed Sep. 13, 2022", 14 pgs.
"U.S. Appl. No. 17/314,963, Advisory Action mailed Sep. 27, 2022", 3 pgs.
"U.S. Appl. No. 17/314,963, Response filed Oct. 11, 2022 to Advisory Action mailed Sep. 27, 2022", 10 pgs.
"U.S. Appl. No. 16/115,259, Non Final Office Action mailed Nov. 1, 2022", 18 pgs.
"Korean Application Serial No. 10-2022-7015893, Response filed Oct. 7, 2022 to Notice of Preliminary Rejection mailed Aug. 11, 2022", w/ English Claims, 17 pgs.
"U.S. Appl. No. 16/126,869, Notice of Allowance mailed Nov. 9, 2022", 7 pgs.
"U.S. Appl. No. 16/126,869, Corrected Notice of Allowability mailed Nov. 16, 2022", 2 pgs.
"Chinese Application Serial No. 201780073911.9, Office Action mailed Nov. 2, 2022", w/ English Translation, 7 pgs.
"U.S. Appl. No. 17/314,963, Notice of Allowance mailed Jan. 13, 2023", 6 pgs.
"U.S. Appl. No. 17/314,963, Corrected Notice of Allowability mailed Jan. 26, 2023", 2 pgs.
"Chinese Application Serial No. 201780065441.1, Office Action mailed Dec. 2, 2022", w/ English translation, 13 pgs.
"U.S. Appl. No. 16/115,259, Response filed Feb. 1, 2023 to Non Final Office Action mailed Nov. 1, 2022", 10 pgs.
"U.S. Appl. No. 16/126,869, Supplemental Notice of Allowability mailed Feb. 16, 2023", 2 pgs.
"U.S. Appl. No. 16/115,259, Examiner Interview Summary mailed Feb. 16, 2023", 2 pgs.
"U.S. Appl. No. 16/115,259, Notice of Allowance mailed Feb. 27, 2023", 8 pgs.
Heath, Alex, "Understanding these emojis will turn you into a Snapchat pro", [Online]. Retrieved from the Internet: <URL: http://www.businessinsider.com/what-do-snapchats-emojis-mean-2016-5?international=true&r=US&IR=T>, (May 28, 2016), 3 pgs.
Vaynerchuk, Gary, "How to Create and Use Snapchat's New Custom Geofilters", [Online] Retrieved from the Internet: <https://garyvaynerchuk.com/how-to-create-and-use-snapchats-new-custom-geofilters/>, (Mar. 15, 2016), 15 pgs.
"U.S. Appl. No. 17/314,963, Notice of Allowance mailed Apr. 14, 2023", 5 pgs.
"Chinese Application Serial No. 201780073911.9, Response filed Mar. 17, 2023 to Office Action mailed Nov. 2, 2022", w/ English Claims, 11 pgs.
"U.S. Appl. No. 16/115,259, Corrected Notice of Allowability mailed Jun. 12, 2023", 3 pgs.
"Chinese Application Serial No. 201780065441.1, Office Action mailed May 26, 2023", w/ English Translation, 14 pgs.
"Korean Application Serial No. 10-2022-7031802, Notice of Preliminary Rejection mailed May 12, 2023", w/ English Translation, 15 pgs.
"Korean Application Serial No. 10-2023-7015209, Notice of Preliminary Rejection mailed Jul. 3, 2023", w/ English Translation, 6 pgs.
"U.S. Appl. No. 17/314,963, Notice of Allowance mailed Aug. 2, 2023", 5 pgs.
"U.S. Appl. No. 17/450,040, Non Final Office Action mailed Aug. 1, 2023", 7 pgs.
"U.S. Appl. No. 16/115,259, Notice of Allowability mailed Dec. 14, 2023", 3 pgs.
"U.S. Appl. No. 17/450,040, Corrected Notice of Allowability mailed Nov. 17, 2023", 2 pgs.
"U.S. Appl. No. 17/450,040, Notice of Allowance mailed Nov. 7, 2023", 8 pgs.
"U.S. Appl. No. 17/450,040, Response filed Oct. 31, 2023 to Non Final Office Action mailed Aug. 1, 2023", 4 pgs.
"U.S. Appl. No. 18/138,552, Corrected Notice of Allowability mailed Jan. 4, 2024", 2 pgs.
"U.S. Appl. No. 18/138,552, Notice of Allowance mailed Apr. 9, 2024", 5 pgs.
"U.S. Appl. No. 18/138,552, Notice of Allowance mailed Dec. 20, 2023", 6 pgs.
"Chinese Application Serial No. 201780065441.1, Office Action mailed Aug. 18, 2023", w/ English Translation, 6 pgs.
"Chinese Application Serial No. 201780065441.1, Response filed Apr. 7, 2023 to Office Action mailed Dec. 2, 2022", w/ current English claims, 9 pgs.
"Chinese Application Serial No. 201780065441.1, Response filed Jul. 25, 2023 to Office Action mailed May 26, 2023", w/ English claims, 13 pgs.
"Chinese Application Serial No. 201780065441.1, Response filed Oct. 31, 2023 to Office Action mailed Aug. 18, 2023", w/ English claims, 13 pgs.
"Chinese Application Serial No. 202310817574.7, Office Action mailed Mar. 14, 2024", w/ English translation, 10 pgs.
"Chinese Application Serial No. 202310817574.7, Response filed Jul. 5, 2024 to Office Action mailed Mar. 14, 2024", W/English Claims, 37 pgs.
"European Application Serial No. 24151986.7, Extended European Search Report mailed Apr. 24, 2024", 9 pgs.
"Korean Application Serial No. 10-2022-7031802, Notice of Preliminary Rejection mailed Dec. 7, 2023", w/ English Translation, 16 pgs.
"Korean Application Serial No. 10-2023-7015209, Response Filed Sep. 4, 2023 To Notice of Preliminary Rejection mailed Jul. 3, 2023", W/ English Claims, 19 Pgs.
"Korean Application Serial No. 10-2024-7008682, Notice of Preliminary Rejection mailed May 16, 2024", W/English Translation, 6 pgs.
"Korean Application Serial No. 10-2022-7031802, Final Office Action mailed Aug. 16, 2024", w/ English translation, 10 pgs.
"U.S. Appl. No. 18/138,552, Corrected Notice of Allowability mailed Sep. 9, 2024", 2 pgs.
"U.S. Appl. No. 18/586,080, Non Final Office Action mailed Sep. 18, 2024", 46 pgs.

* cited by examiner

GENERATING AND DISPLAYING CUSTOMIZED AVATARS IN ELECTRONIC MESSAGES

CROSS-REFERENCE TO RELATED APPLICATIONS

This application is a continuation of and claims the benefit of priority to U.S. patent application Ser. No. 17/247,169, filed on Dec. 2, 2020, which is a continuation of and claims the benefit of priority to U.S. patent application Ser. No. 16/552,003, filed on Aug. 27, 2019, which is a continuation of and claims the benefit of priority to U.S. patent application Ser. No. 15/365,046, filed on Nov. 30, 2016, which claims the benefit of priority to U.S. Provisional Patent Application Ser. No. 62/412,115, filed on Oct. 24, 2016, the disclosures of each of which are incorporated by reference in their entireties.

BACKGROUND

The popularity of electronic messaging, particularly instant messaging, continues to grow. Users increasingly use "emoji" (which are ideograms and icons) within electronic messages such as texts and emails, reflecting a global demand to communicate more visually. However, conventional emoji and similar graphics are typically generic and lacking in diversity: every individual user is represented by the same set of faces, irrespective of appearance, gender or ethnicity. Furthermore, every conversation that uses conventional emoji looks identical, and there is no visual personality or cue to identify the participants or distinguish one interaction from the next. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by generating customized images with avatars of different users within electronic messages. For example, users of different mobile computing devices can exchange electronic communications with images generated to include avatars representing themselves as well as their friends, colleagues, and other acquaintances.

In some embodiments, images may be generated that contain avatars of users who exchange electronic communications, such as SMS or MMS texts and emails. Such images may be automatically generated based on the history of communications between users, the users' locations, and events the users are engaged in. The appearance of users' avatars may likewise be modified based on location and event information.

In some embodiments, images and other content that is received by a computing device may be analyzed to identify features of the content, such as the tone of a message. Based on the identified features, response images (e.g., containing one or more user avatars) can be generated appropriate to the content and/or communication history between users.

Figure 1:
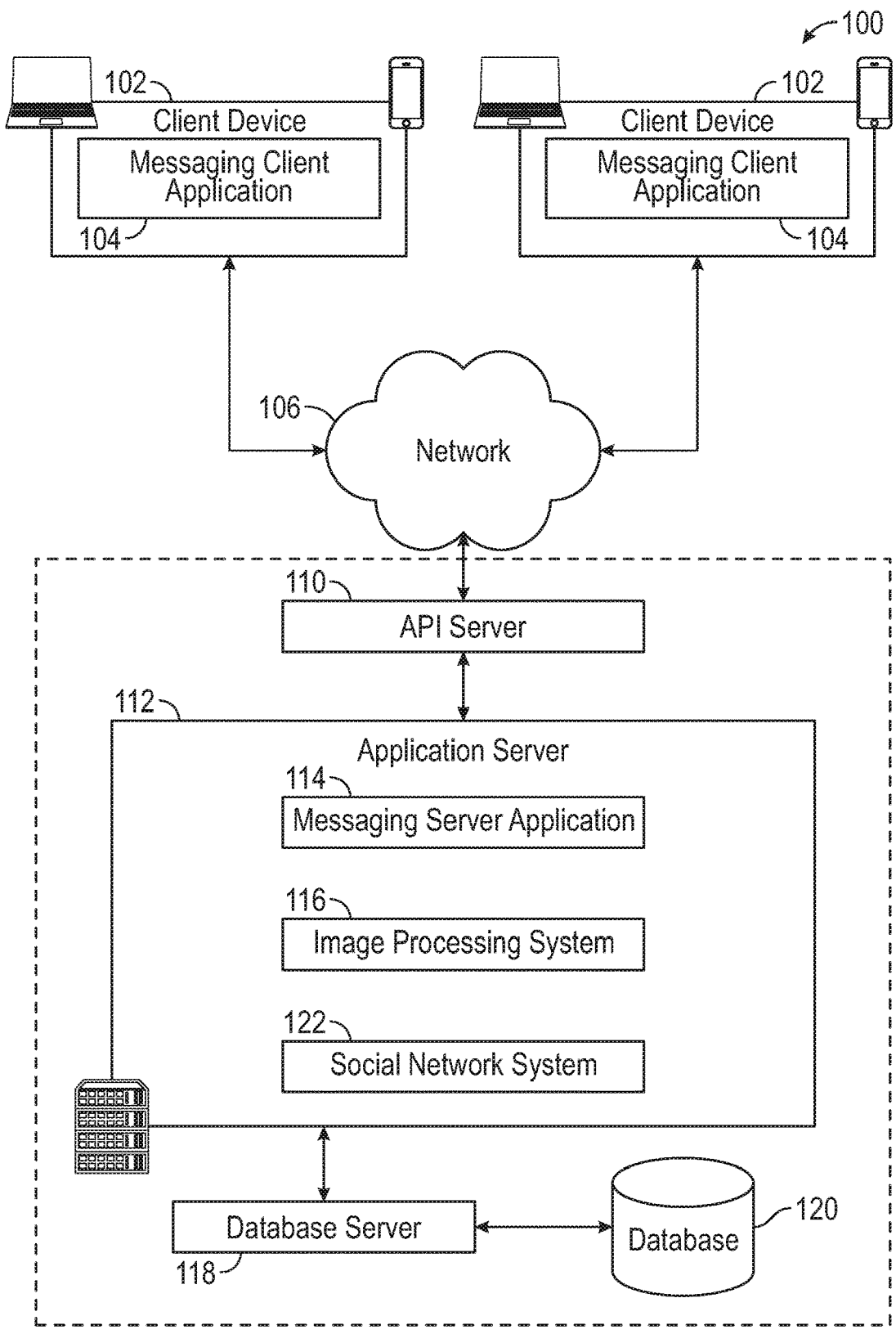
FIG. 1 is a block diagram showing an example messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, and/or any other wearable devices.

Figure 2:
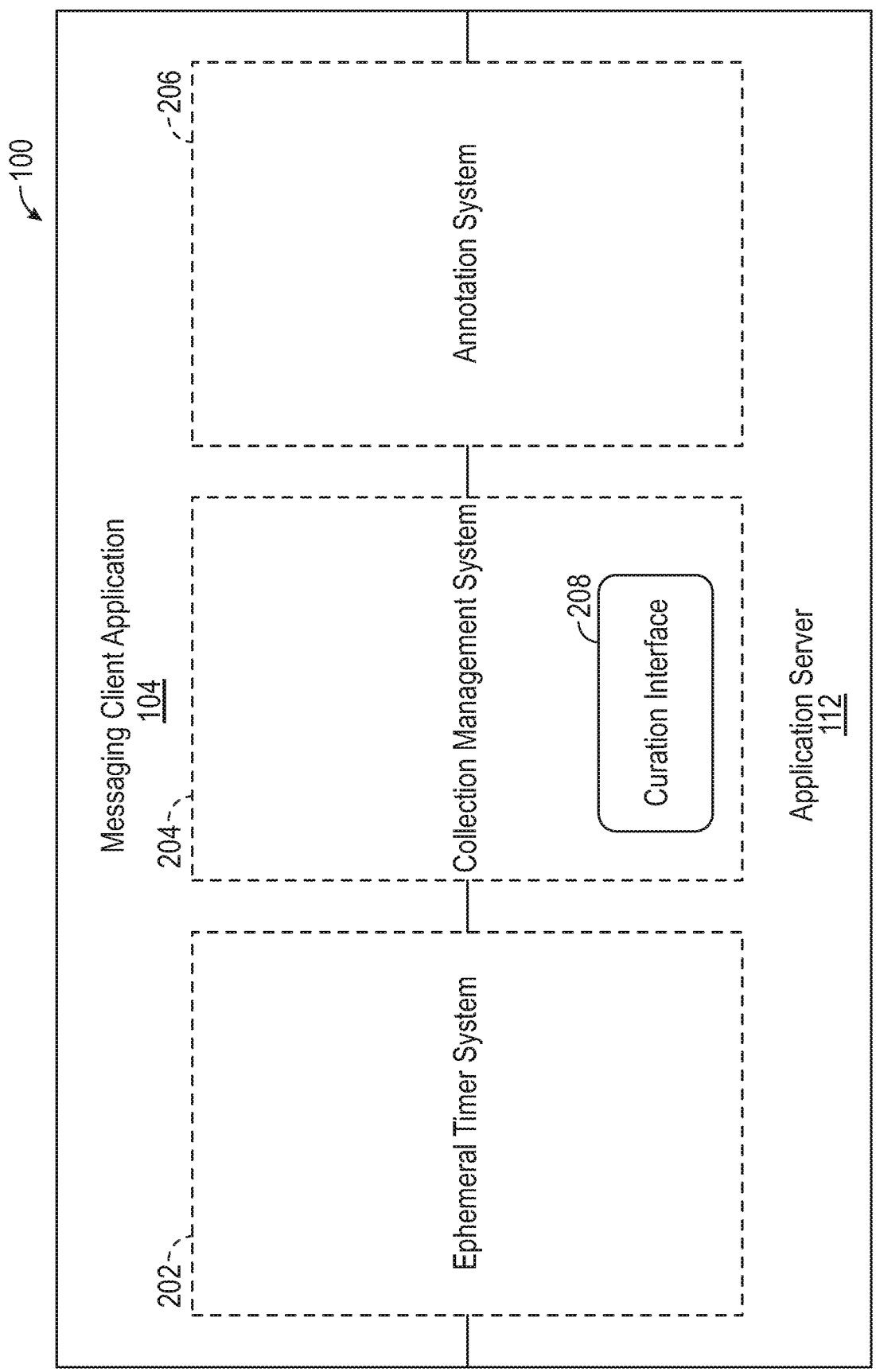
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
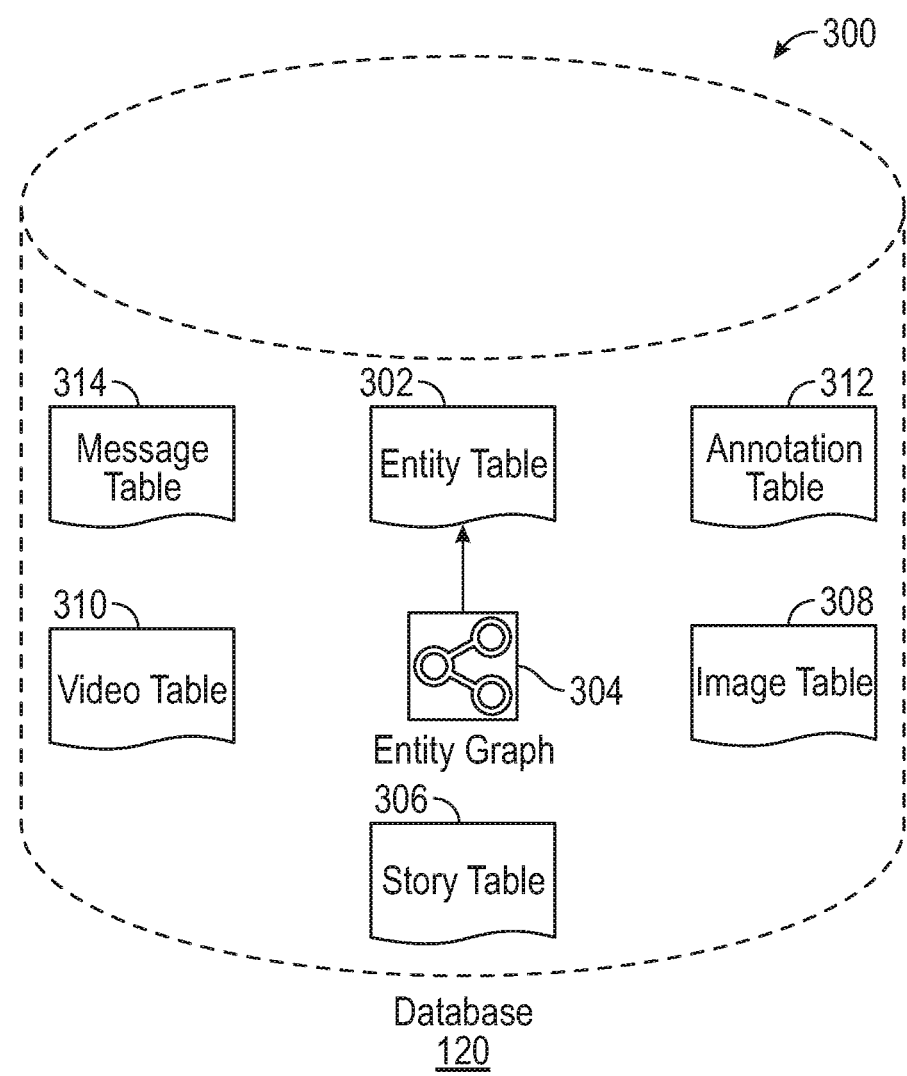
FIG. 3 is a schematic diagram illustrating data which may be stored in the database of the messaging server system, according to various exemplary embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein.

Figure 4:
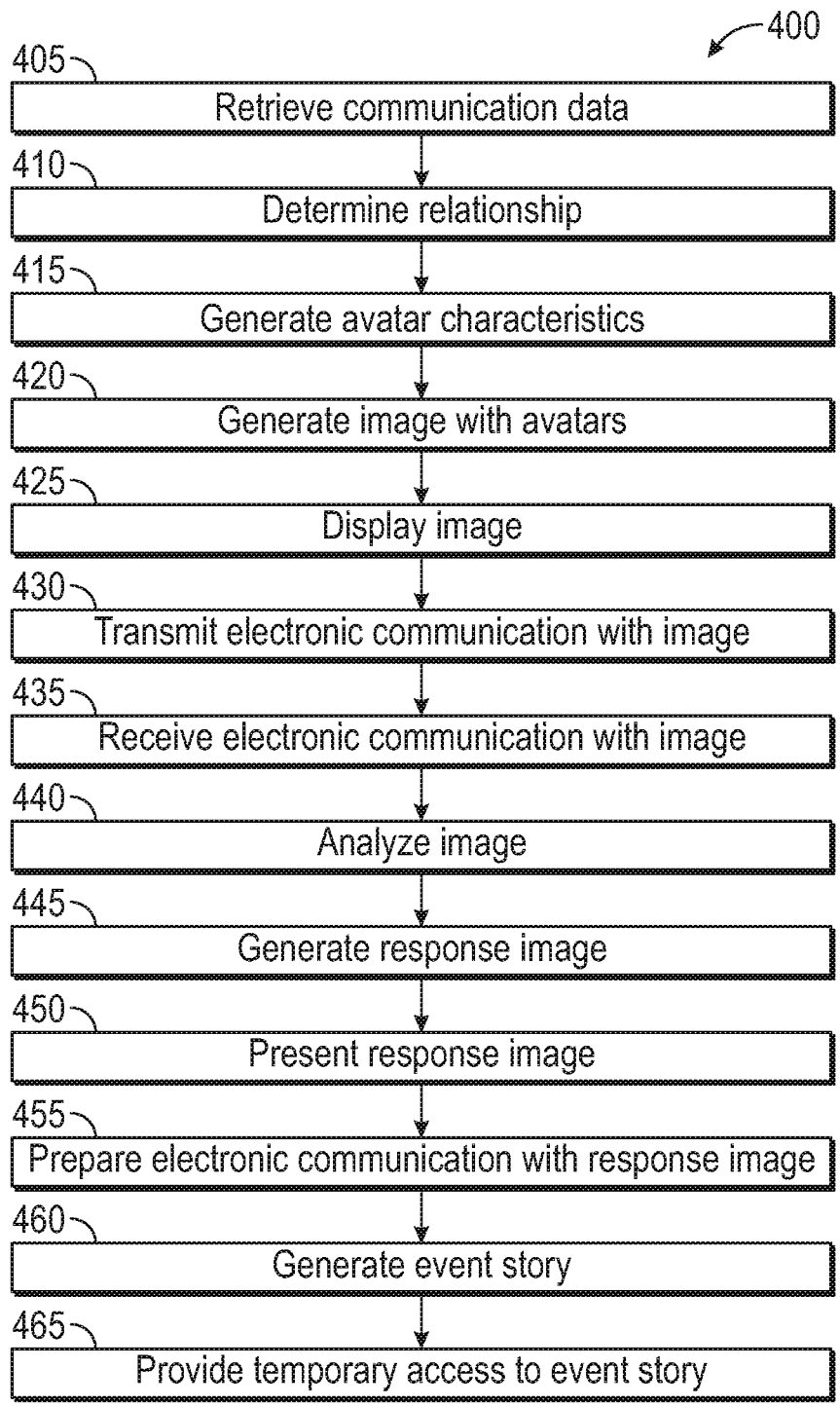
FIG. 4 is an exemplary flow diagrams of a process according to various aspects of the disclosure.

FIG. 4 depicts an exemplary process according to various aspects of the present disclosure. In this example, method 400 includes retrieving communication data regarding communications between one or more users (405), determining a relationship between the users based on the communication data (410), generating avatar characteristics based on the relationship (415), generating an image containing avatars representing the users based on the avatar characteristics (420), displaying the image on a display (425), and transmitting an electronic communication containing the image (430). Method 400 further includes receiving an electronic communication containing an image (435), analyzing the received image (440), generating a response image based on the analysis (445), presenting the response image to a user receiving the electronic communication (450), preparing an electronic communication containing the response image (455), generating an event story based on communications between users (460), and providing temporary access to the event story (465). The steps of method 400 may be performed in whole or in part, may be performed in conjunction with some or all of the steps in other methods, and may be performed by any number of different systems, such as the systems described in FIGS. 1 and/or 7.

Embodiments of the present disclosure can retrieve (405) a variety of communication data from a variety of sources. For example, communication data may be retrieved from the memory of a computing device (such as client computing device 102 in FIG. 1) performing some or all of the functionality of method 400. Alternately or additionally, communication data may be retrieved from another computing device (e.g., over a network). Communication data may include a history of electronic communications (such as emails, text messages, and the like) between a plurality of users. For example, consider two users, a first user and a second user, who exchange a series of text messages with each other using their respective mobile computing devices (e.g., client computing devices 102 in FIG. 1). The computing device of the first user may be adapted to store the messages in its memory for later retrieval, or to request the messages (or information regarding them) from another source (such as application server 112 in FIG. 1).

The communication data may include meta data associated with one or more communications, such as the size of the communication, the date/time it was sent, one or more languages used in the communication, identifiers for the sender and/or recipient(s), information regarding the computing devices (e.g. the mobile devices of the sender or recipient or a messaging server) involved in transmitting or receiving the communication, and other information. In the case of identification information, any such identifier may be used, such as the user's full name or a username associated with the user. The user identifier may also be an identifier associated with the user's computing device, such as a Unique Device Identifier (UDID) or Identifier for Advertising (IDFA). The communication data may also include text, images, video, and other content within a communication. For example, the communication data may include terms used by users within one or more communications to address each other, such as "hi mom," "hey buddy," "how's my favorite nephew," and the like. Such terms (and other communication data) may be used to help identify a relationship between users based on their communications with each other as discussed below.

The system may request authorization from a user to analyze communication data associated with the user's communications. The authorization request may be presented to the user via the user's computing device and may allow the user to select the types of communication data the system may analyze as well as allowing the user to entirely disable the system from analyzing the user's communication data altogether. In cases where the user grants the system access to analyze the user's communication data, the system can analyze the communication data to automatically determine (410) a relationship between the user and other users with whom the user communicates.

Embodiments of the present disclosure can identify any number of different relationships between any number of users. Examples of such relationships may include family relationships, friendships, or romantic relationships, as well as others. Embodiments of the disclosure may also identify other aspects of relationships between users, such as whether the users are work colleagues, classmates, roommates, and/or acquaintances. Analysis of communication data to identify relationships between users may also be supplemented with other information, such as data retrieved from social networking sites, as well as direct input from the user providing information on his/her relationships with various users.

Based on the relationship between different users, the system can generate characteristics for avatars (415) that represent the different users and use such avatar characteristics to generate images (420) containing the avatars of the users. As used herein, an "avatar" of a user is any visual representation of user. The avatar of a user may be based on images of the user in conjunction with the avatar characteristics identified from the user's relationships with other users. Alternatively or additionally, the user may select and customize characteristics of the user's avatar via the user's computing device. Such characteristics may include, for example, the user's bodily features (e.g., muscular, thin, etc.), facial features, clothing and accessories, text displayed in conjunction with the avatar, and images displayed in conjunction with the avatar.

Figure 5A:
FIGS. 5A-5E are screenshots illustrating the steps of the method described in FIG. 4.

Embodiments of the present disclosure may generate (420) images containing any number of avatars. For example, an image containing a single avatar may be generated in some cases, while an image containing multiple user avatars may be generated in other cases. FIGS. 5A-5E illustrate exemplary images that include a first avatar representing a first user and a second avatar representing a second user according to various aspects of the disclosure. Such images may be displayed (425) on the display screen of one or more computing devices, such as in a menu of image options to include within an electronic communication to another user, or within electronic communication itself. Images generated by embodiments of the present disclosure may include any number of user avatars in a variety of forms. For example, FIG. 5A depicts an avatar of a first user with the avatar of a second user on his shirt.

In some embodiments, the generation of images containing avatars may be performed in conjunction with displaying the avatars within a video game. In some cases, the images may be displayed in a single-person game (e.g., played alone by a first user on the first user's computing device) or in a multi-player game (e.g., the game is accessed by the computing device of a first user and the computing device of a second user) played over a network or other connection. During the game, various events may occur and the avatars of one or more users may be modified as a result. For example, an avatar who experiences an injury may be depicted with a black eye, while an avatar who finds an item in the game (e.g., a sword) can be modified to show the avatar carrying the item. In this manner, embodiments of the disclosure allow users to have their own customized avatars (which may be based on their own likenesses) appear in video games as well as in other contexts, such as text messages or other electronic communications.

Generation of the images containing user avatars may be based on an event. The event may affect one user (such as the user's birthday) or be common to multiple users. For example, referring to FIG. 5B, an image depicting avatars of two users is generated based on a day of the week.

Generation of the images containing user avatars may be based on the locations of different users. For example, embodiments of the present disclosure may retrieve location information from the computing devices of two different users. In embodiments where a client computing device (such as client device 102) is performing the image generation, location information for the device can be retrieved from the device's global positioning system and location information for the device of another can be requested over a network.

The avatars of different users in different locations can be generated to reflect their respective locations. For example, the avatar of a first user whose mobile computing device indicates is in the tropics could be depicted standing in a bathing suit on a beach, while the avatar of a second user whose mobile device indicates is in an area with snow could be depicted wearing a jacket and shivering. Accordingly, the location information from a device associated with a user can be combined with information regarding the location and/or an event occurring at the location to generate the avatar and/or image. Such location-based information may include weather information, time of day, local customs (such as language and/or dress), and other information.

In some cases, the system can identify that two or more users are in a common location. In this context, a "common location" may be identified as being within any predetermined boundary, such as within the same building, the same city, the same two-block radius, the same state, etc. In such cases, the image can be generated to depict the avatars of multiple users based on the common location. As described above, the image containing multiple avatars may be generated based on information regarding the location as well as identifying an event taking place at the common location. Such events may include, for example, a sporting event, a business meeting, an educational event, a pre-arranged meeting between the user and another person (such as a lunch meeting), and other events.

Figure 5B:
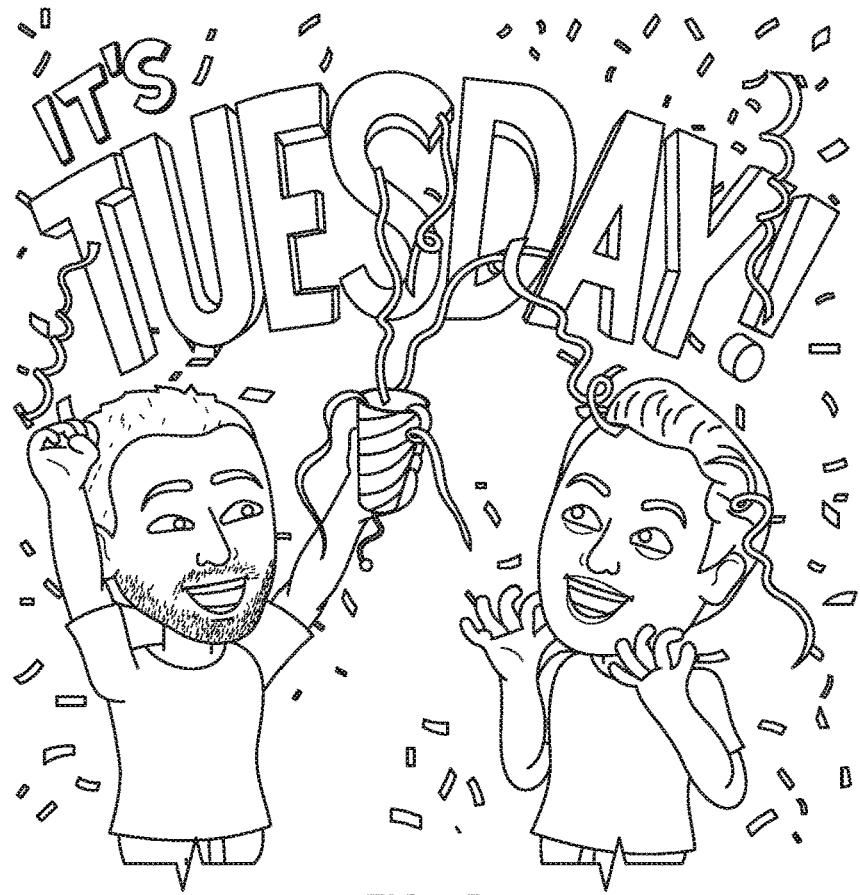
Figure 5C:
Figure 5D:
Figure 5E:

In one exemplary embodiment, referring to FIG. 5C, the system identifies that a first user and second user are both participating in a race, and that the first user finished the race ahead of the second user. The system then automatically generates the image in FIG. 5C and presents the image to the first user and/or second user via their mobile computing devices for inclusion in an electronic communication. In this example, the details of the event (i.e., race in this case) can be identified by the system based on information from a combination of different sources, such as location information from each user's mobile computing device, information about the race occurring collected from a website hosted by the race's sponsor based on a web search using the identified location, posts by the first and second user to a social media website, and a history of electronic communications between the first and second user where the second user congratulates the first user on winning and the first user consoling the second user. In this manner, the system can utilize a combination of publically-available information and information the system is authorized by the user to access (such as the content of the user's communications) to automatically generate an image including the user's avatar and/or the avatars of other users.

In some embodiments, the system may modify various features of an avatar, as well as features of an image containing an avatar, based on location information and/or event information. In FIG. 5B, for example, a similar image could be generated for other days of the week where the setting or background of the image displaying the name of the day of the week (e.g., Wednesday vs. Tuesday) can be modified. Likewise, either avatar can be modified based on various information. For example, referring now to FIG. 5D, the system may identify an event taking place at a common location (a cupcake festival in this example) and generate an image of the first user standing next to the second user, where the second user's body is depicted as a cupcake. As above, the image can be generated based on content of communications between the users, such as based on a comment by the second user in a text message to the first user that "I ate so many cupcakes, I feel like one."

The system can modify avatars and images based on identified events and locations in any suitable manner. For example, avatars of users attending the same sporting event could be depicted in an image wearing the jersey of one of the teams playing at the event. Users attending a paintball event together could result in an image being generated showing avatars of the users holding paintguns and covered in paint. Users attending a mud obstacle race could result in an image being generated showing avatars of the users covered in mud. Furthermore, information from users' electronic communications between each other and/or social network posts can be used to identify an event attended by the user and use such information to generate avatar attributes and images.

In some exemplary embodiments, the system can identify users at a common location, generate images containing the avatars of such users, and initiate (automatically or in response to user activation) the transmission of electronic communications to such users. For example, if a first user and second user attend an event (such as a baseball game at a stadium) together, the system (e.g., via the first user's mobile computing device) may (e.g., automatically with the first user's authorization or in response to the first user's instruction) search for other users in the contact list of the first user's mobile device who are also at the stadium. In response to identifying a third user, the system may then generate an image containing avatars representing the first, second, and third users (e.g., all wearing team jerseys) and transmit an electronic message/communication containing the image to a mobile computing device carried by the third user (e.g., in a text message). Among other things, this can help users quickly identify and reach out to people they know at various events and locations.

Embodiments of the present disclosure may transmit (430) and/or receive (435) electronic communications containing images with avatars. Any form of electronic communication may be utilized by embodiments of the present disclosure, such as SMS texts, MMS texts, emails, and other communications. Images included in such communications may be provided as attachments, displayed inline in the message, or conveyed in any other suitable manner.

In some embodiments, the system may generate a plurality of images containing one or more avatars and allow a user of the system to select which image(s) he/she wishes to include in an electronic communication. In some embodiments, the generation of such images may be based on the content of communications sent or received by the system, as well as on other communication data as discussed above. In one particular embodiment, a computing device operated by a first user receives (435) an electronic communication from the computing device of a second user, where the communication contains an image that includes avatars representing the first and second user. In this example, the computing device of the first user is adapted to analyze the image in order to identify its content, then generate (445) one or more response images and present (450) the response image(s) to the first user (e.g., via the display screen of the user's computing device) for selection by the user. The selected image(s) are then included in an electronic communication (455) that can be transmitted to the computing device of the second user.

Embodiments of the present disclosure can identify a variety of content in the received image and generate response images accordingly. Such content may include, for example, For example, referring now to FIG. 5E, consider an image received from the second user showing avatars of the first and second user "high-fiving" with the caption "high five!" in the background. In this example, the system may analyze the image to identify the avatars of the first and second user, as well as the tone of the image, which is upbeat and positive in this example. The system may then generate one or more response images that are likewise upbeat and positive and that also include both avatars.

As with other images described above, the response image may further be generated based on other information, such as the text content of communications between the first and second user, the history of communications between the users, and information from sources outside the communications, such as data gathered from social network sites. In this manner, the system can not only generate initial images that are pertinent and useful to users in communicating with others, but can generate response images that are contextually congruent to the communications between different users. In the case of the image shown in FIG. 5E, for example, the response images generated and presented to the first user could be restricted to images that match the overall tone of the conversation and are thus appropriate to the mood of the participants in the conversation.

As described in more detail above, embodiments of the disclosure may generate an event story or event gallery (460) based on a collection or series of electronic communications between users and provide temporary access to the event story or gallery (465). Any collection of such communications may be selected based on any criteria, and one or more users may be granted access to an event story or gallery for any desired predetermined period of time. Likewise, the system may grant access to images generated by the system or received from other system for a predetermined period of time as described above. Such images may also be presented in conjunction with a media overlay (e.g., a SNAPCHAT filter).

Software Architecture

Figure 6:
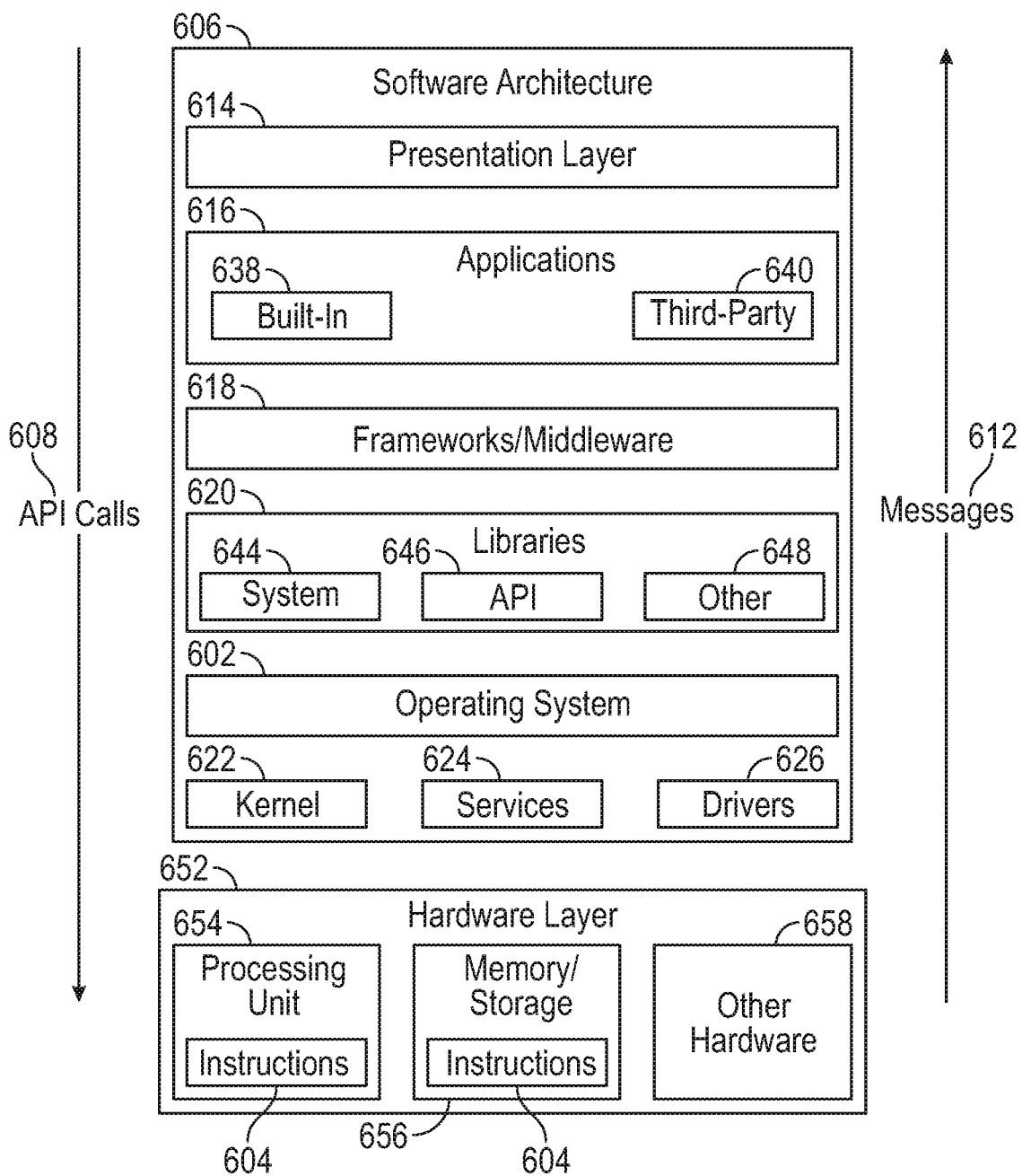
FIG. 6 is a block diagram illustrating a representative software architecture, which may be used in conjunction with various hardware architectures herein described.

FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
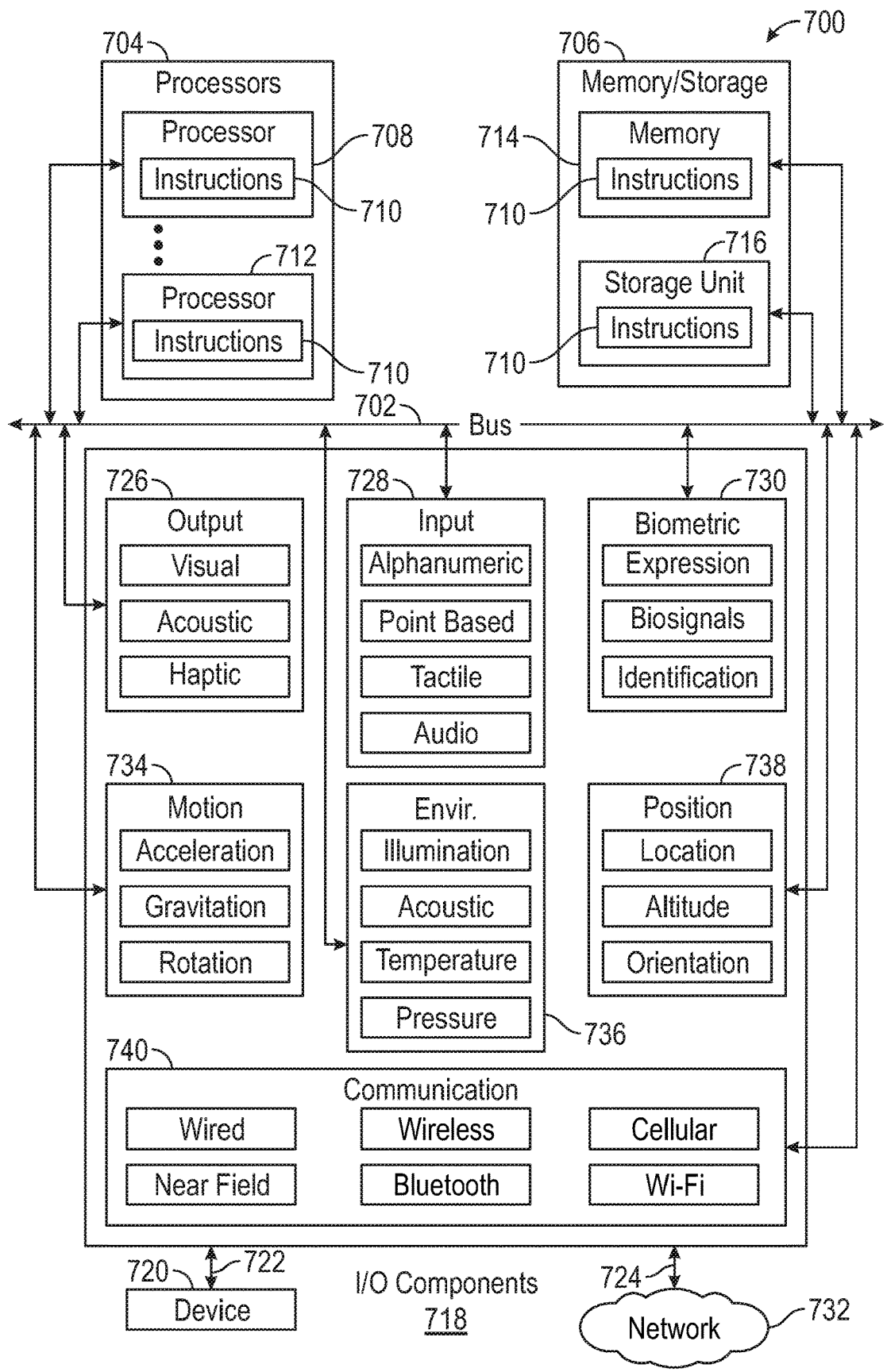
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates and/or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAPCHAT, INC. 2016, All Rights Reserved.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
a processor; and
memory coupled to the processor and storing instructions that, when executed by the processor, cause the processor to perform operations comprising:
receiving, from a first computing device, a first electronic communication including a sent image, the first electronic communication being between a first user of the first computing device and a second user of a second computing device;
analyzing the sent image to identify content of the sent image;
generating a response image based on the content of the sent image, wherein the response image comprises a first avatar representing the first user and a second avatar representing the second user that are generated based on avatar characteristics;
causing the response image to be displayed on the second computing device; and
in response to selection of the response image on the second computing device,
generating a second electronic communication including the response image, and
causing the second electronic communication including the response image to be transmitted from the second computing device to the first computing device.

2. The system of claim 1, wherein the processor to perform operations comprising:
retrieving communication data from the memory, the communication data including the first electronic communication;
generating avatar characteristics based on the communication data between the first user and the second user.

3. The system of claim 2, wherein the processor to perform operations comprising:
determining, based on the communication data, a relationship between the first user and the second user,
wherein generating avatar characteristics based on the communication data comprises generating avatar characteristics based on the relationship between the first user and the second user.

4. The system of claim 3, wherein determining, based on the communication data, the relationship includes determining the relationship based on a term within a plurality of electronic communications used by the first user to address the second user or a term within a plurality of electronic communications used by the second user to address the first user.

5. The system of claim 3, wherein the relationship between the first user and the second user is determined to be one of:
a family relationship, a friendship, or a romantic relationship.

6. The system of claim 3, wherein the relationship between the first user and the second user is further determined to be one of:
work colleagues, classmates, roommates, or acquaintances.

7. The system of claim 2, wherein the communication data includes a history of electronic communications between the first user and the second user, wherein the history of electronic communications includes a plurality of electronic communications including the first electronic communication.

8. The system of claim 1, wherein generating the response image includes:
retrieving location information for the first computing device;
retrieving location information for the second computing device; and
generating the response image based on the location for the first computing device or the location for the second computing device.

9. The system of claim 8, wherein generating the response image based on the location for the first computing device or the location for the second computing device includes one of:
modifying a setting of the image, modifying the first avatar, or modifying the second avatar.

10. The system of claim 8, wherein generating the response image based on the location for the first computing device or the location for the second computing device includes:
identifying an event taking place at the location for the first computing device or the location for the second computing device; and
generating the response image based on the event.

11. The system of claim 10, wherein the event is one of:
a sporting event, a concert, a party, a business meeting, an educational event, or a pre-arranged meeting between the first user and the second user.

12. The system of claim 10, wherein generating the response image includes:
retrieving information from an online social network in communication with the system regarding the event; and
modifying the response image based on the information regarding the event.

13. The system of claim 8, wherein generating the response image based on the location for the first computing device or the location for the second computing device further includes:
  identifying a third computing device of a third user based on location information received from the third computing device;
  generating the response image to include a third avatar representing the third user; and
  causing a third electronic communication including the response image to be transmitted from the first computing device to the third computing device.

14. The system of claim 1, wherein the processor performs operations further comprising:
  generating an event story comprising a series of a plurality of electronic communications between the first user and the second user; and
  receiving authorization from the first computing device for access to the event story for a predetermined period of time.

15. The system of claim 14, wherein the processor performs operations further comprising:
  receiving a selection of the event story from the second computing device within the predetermined period of time; and
  causing the event story to be displayed on the second computing device.

16. The system of claim 1, wherein generating the response image includes:
  generating the response image within a video game; and
  causing the video game to be displayed on the first computing device and the second computing device.

17. The system of claim 16, wherein the first avatar and the second avatar included in the image are dynamically modified based on events occurring within the video game.

18. A computer-implemented method comprising:
  receiving, from a first computing device, a first electronic communication including a sent image, the first electronic communication being between a first user of the first computing device and a second user of a second computing device;
  analyzing the sent image to identify content of the sent image;
  generating a response image based on the content of the sent image, wherein the response image comprises a first avatar representing the first user and a second avatar representing the second user that are generated based on avatar characteristics;
  causing the response image to be displayed on the second computing device; and
  in response to selection of the response image on the second computing device,
  generating a second electronic communication including the response image, and
  causing the second electronic communication including the response image to be transmitted from the second computing device to the first computing device.

19. A non-transitory computer-readable medium storing instructions that, when executed by a processor, cause the processor to perform operations comprising:
  receiving, from a first computing device, a first electronic communication including a sent image, the first electronic communication being between a first user of the first computing device and a second user of a second computing device;
  analyzing the sent image to identify content of the sent image;
  generating a response image based on the content of the sent image, wherein the response image comprises a first avatar representing the first user and a second avatar representing the second user that are generated based on avatar characteristics;
  causing the response image to be displayed on the second computing device; and
  in response to selection of the response image on the second computing device,
  generating a second electronic communication including the response image, and
  causing the second electronic communication including the response image to be transmitted from the second computing device to the first computing device.

20. The non-transitory computer-readable medium of claim 19, wherein generating the response image further comprises:
  retrieving location information for the first computing device;
  retrieving location information for the second computing device; and
  generating the response image based on the location for the first computing device or the location for the second computing device.

* * * * *